United States Patent
Tsuboi et al.

(10) Patent No.: US 10,960,635 B1
(45) Date of Patent: Mar. 30, 2021

(54) MULTILAYER TUBE

(71) Applicant: UBE INDUSTRIES, LTD., Ube (JP)

(72) Inventors: Kazutoshi Tsuboi, Ube (JP); Riyousuke Sasaki, Ube (JP); Riyuu Fukuda, Ube (JP); Koji Nakamura, Ube (JP)

(73) Assignee: Ube Industries, Ltd., Ube (JP)

( * ) Notice: Subject to any disclaimer, the term of this patent is extended or adjusted under 35 U.S.C. 154(b) by 0 days.

(21) Appl. No.: 16/961,421

(22) PCT Filed: Jan. 16, 2019

(86) PCT No.: PCT/JP2019/001033
§ 371 (c)(1),
(2) Date: Jul. 10, 2020

(87) PCT Pub. No.: WO2019/142808
PCT Pub. Date: Jul. 25, 2019

(30) Foreign Application Priority Data

Jan. 16, 2018 (JP) .............................. JP2018-005108

(51) Int. Cl.
| B32B 1/08 | (2006.01) |
| B32B 27/08 | (2006.01) |
| B32B 27/34 | (2006.01) |
| B32B 27/32 | (2006.01) |
| B32B 27/22 | (2006.01) |

(52) U.S. Cl.
CPC ............... B32B 1/08 (2013.01); B32B 27/08 (2013.01); B32B 27/22 (2013.01); B32B 27/32 (2013.01); B32B 27/34 (2013.01); B32B 2250/03 (2013.01); B32B 2250/24 (2013.01); B32B 2307/558 (2013.01); B32B 2323/10 (2013.01); B32B 2377/00 (2013.01); B32B 2597/00 (2013.01)

(58) Field of Classification Search
CPC ........... B32B 1/08; B32B 27/08; B32B 27/32; B32B 27/22; B32B 27/34; B32B 2250/03; B32B 2597/00; B32B 2323/10; B32B 2250/24; B32B 2307/558; B32B 2377/00
See application file for complete search history.

(56) References Cited

U.S. PATENT DOCUMENTS

| 5,588,468 A | 12/1996 | Pfleger |
| 2003/0148125 A1 | 8/2003 | Inaba et al. |
| 2003/0157335 A1 | 8/2003 | Inaba et al. |
| 2003/0232207 A1* | 12/2003 | Thullen ............... C08L 2666/24 428/476.3 |
| 2004/0191440 A1 | 9/2004 | Funaki et al. |
| 2005/0189030 A1 | 9/2005 | Katayama |
| 2006/0083884 A1 | 4/2006 | Cheng |
| 2007/0148388 A1 | 6/2007 | Kuhmann et al. |
| 2014/0106103 A1* | 4/2014 | Arakawa ................... B32B 7/12 428/36.8 |
| 2016/0214343 A1 | 7/2016 | Nakamura et al. |
| 2019/0091962 A1 | 3/2019 | Kurumiya et al. |

FOREIGN PATENT DOCUMENTS

| EP | 0 754 898 A1 | 1/1997 |
| JP | H07-214647 A | 8/1995 |
| JP | H09-029869 A | 2/1997 |
| JP | 2000-246852 A | 9/2000 |
| JP | 2004-301247 A | 10/2004 |
| JP | 2005-140199 A | 6/2005 |
| JP | 2005-216725 A | 8/2005 |
| JP | 2006-116966 A | 5/2006 |
| JP | 2007-253459 A | 10/2007 |
| JP | 2008-507436 A | 3/2008 |
| JP | 2011-224988 A | 11/2011 |
| WO | WO 2001/058686 A1 | 8/2001 |
| WO | WO 2001/060606 A1 | 8/2001 |
| WO | WO 2015/033982 A1 | 3/2015 |
| WO | WO 2017/170985 A1 | 10/2017 |

* cited by examiner

*Primary Examiner* — Michael C Miggins

(74) *Attorney, Agent, or Firm* — Knobbe Martens Olson & Bear LLP

(57) ABSTRACT

A multilayer tube having excellent low temperature impact resistance, breakage pressure strength at high temperature, flexibility, dimensional stability, and elution resistance of low molecular weight substances and ion components. The multilayer tube has a layer containing an aliphatic polyamide composition having a predetermined range of a bending elastic modulus; a layer containing a modified polyolefin has a melting point over a predetermined temperature, and the aliphatic polyamide composition contains an aliphatic polyamide having a predetermined range of a methylene group/amide group number ratio, an elastomer polymer having a constituent unit derived from a carboxyl group and/or acid anhydride group-containing unsaturated compound, and a plasticizer having a certain structure if necessary; and the thickness of the layer containing the aliphatic polyamide composition is a specific ratio or more of the total wall thickness of the tube.

12 Claims, No Drawings

MULTILAYER TUBE

This application is the U.S. National Phase under 35 U.S.C. § 371 of International Application PCT/JP2019/001033, filed Jan. 16, 2019, designating the U.S., and published in Japanese as WO 2019/142808 on Jul. 25, 2019 which claim priority to Japanese Patent Application No. 2018-005108, filed Jan. 16, 2018, the entire content of which is incorporated herein by reference.

TECHNICAL FIELD

The present invention relates to a multilayer tube.

BACKGROUND ART

Many hoses and tubes are used in various pressure tubes such as an oil pressure tube and a water pressure tube, a vacuum tube, a fuel tube used for automobiles, a brake tube, a hose for coolant, a tube for air conditioner, a tube for SCR (a machine for removing an exhaust gas in a diesel engine), a control cable liner, and the like. In these hoses and tubes, chemical liquids such as coolants (alcohols and water), refrigerants, oils, and urea solutions are transported. For various hoses and tubes used in automobile industry, extremely high properties such as high breakage pressure strength at high temperature, long period heat resistance, chemical resistance, barrier properties to water vapor and chemical liquids, and flexibility are required.

In particular, when a circulating fluid is a coolant (LLC) containing ethylene glycol as the main component for freeze prevention in winter season, a urea solution enclosed as a catalyst for removing NOx exhausted from a diesel engine, or a refrigerant such as carbon dioxide, freon, alternative freon, propane, and water used in an air conditioner, a radiator, or the like, if the hoses and tubes have insufficient barrier properties to these chemical liquids, the cooling effect and catalysis effect cannot be exerted during actual use. Further, with tightening regulations on transpiration of ozone depleting gases, needs for barrier properties to refrigerants of a tube for transporting refrigerants used in automobiles are demanding.

Apart from this, with tightening regulations on transpiration of ozone depleting gases, properties of refrigerants used in automobiles have been improved recently. For example, R-1234yf refrigerant was developed as an alternative refrigerant of HFC-134a refrigerant. R-1234yf refrigerant has a lower ozone depletion potential and global warming potential than HFC-134a refrigerant, and is an extremely mild refrigerant for global environment. However, in particular, R-1234yf refrigerant tends to be hydrolyzed when contacted with water under high temperature environment to form an acid (for example, formic acid). As a result from the acid, a material contacting with chemical liquids tend to be hydrolyzed or degraded depending on the type of the material, and at worst, there are problems in that cracks are formed in the material, liquids are leaking and the purpose of transporting fluids can not be accomplished. Alternatively, when chemical liquids or water is penetrating through the tube body, parts contacting with the liquids or water may be adversely affected.

A monolayer tube using a conventionally used polyamide-based resin, in particular, using Polyamide 11 or Polyamide 12 having excellent strength, toughness, chemical resistance, and flexibility alone has insufficient long-term durability and barrier properties to the chemical liquids described above.

Since fluorinated resins such as ethylene/tetrafluoroethylene copolymer (ETFE) has particularly excellent resistance to various chemical liquids, they are believed to be one of the material members having barrier properties to water vapor. A fluorinated resin having adhesion to polyamides has been actively developed recently (Referring to Patent Documents 1 to 3). However, use of halogen-containing materials tends to be avoided on dealing with environmental problems and the resin has problems of the high specific gravity and high cost. Therefore, Development of a tubing system using a halogen-free material, and having excellent barrier properties to chemical liquids and resistance to various chemical liquids is required.

On the other hand, polyolefin is less expensive, and has excellent resistance to permeation of chemical liquids and long-term resistance to chemical liquids. For example, a cooling tube constituting an outer layer composed of a polyamide and an inner layer composed of a cross-linked polyethylene was suggested (referring to Patent Document 4). Further, a cooling tube constituting an outer layer composed of a polyamide and an inner layer composed of a polyethylene having over a certain level of thickness and containing a certain additive was suggested (referring to Patent Document 5). Similarly, a cooling tube that are inert to refrigerants and don't swell with refrigerants is suggested. The cooling tube constitutes an outer layer composed of a polyamide and an inner layer composed of a halogenated or non-halogenated homopolyolefin or copolyolefin, produced by extrusion blow molding. The cooling tube has varying wall thickness along the length of its conduit, and the polymer of the inner layer has clearly different flexibility compared to that of the outer layer (referring to Patent Document 6). Further, a multilayer tube having an inner layer of a polyolefin, a first intermediate layer based on an adhesive, a second intermediate layer of an ethylene/vinyl alcohol copolymer, a third intermediate layer of a polyamide, and an outer protective layer from the inside to the outside of the multilayer tube was suggested (referring to Patent Document 7). Further, a tube for fuel battery having an outer layer using a material for the outer layer containing a polyamide-based resin and a styrene/isobutylene block copolymer as the essential components and an inner layer using a material for the inner layer containing a polyolefin-based resin and a styrene/isobutylene block copolymer as the essential components was suggested (referring to Patent Document 8).

PRIOR ART DOCUMENTS

Patent Documents

Patent Document 1: WO 2001/058686
Patent Document 2: WO 2001/060606
Patent Document 3: JP 2004-301247 A
Patent Document 4: JP H9-29869 A
Patent Document 5: JP 2008-507436 A
Patent Document 6: JP H7-214647 A
Patent Document 7: JP 2006-116966 A
Patent Document 8: JP 2005-216725 A

SUMMARY OF THE INVENTION

Problem to be Solved by the Invention

However, in the tube disclosed in Patent Document 4, when polyethylene is used as the inner layer, the tube has poor long-term resistance at high temperature and properties of the tube. Further, for a tube such as a tube for transporting chemical liquids, a catalyst pollution by contaminating a sulfur component to a chemical liquid flowing the inner part of the tube and an occlusion to the inner part of the tube by eluting low molecular weight substances are concerned. However, specific technical data and technical suggestions are not described in Patent Documents 5 to 7. In Patent Document 8, the styrene/isobutylene block copolymer included in the material for the outer layer has insufficient effect of improving flexibility, its further improvement is required. Aside from them, a space mounting tubes becomes narrower. In electrical automobiles, a piping layout becomes complicated for improving its cooling effectivity. Under these circumstances, from the viewpoint of workability of the parts and the layout flexibility, the flexibility of the multilayer tube is required. Additionally, having high pressure resistance which can resist internal pressure of chemical liquids at high temperature atmosphere in addition to the flexibility is required.

An object of the present invention is to solve the above-mentioned problems and to provide a multilayer tube having excellent low temperature impact resistance, breakage pressure strength at high temperature, flexibility, dimensional stability, and elution resistance of low molecular weight substances and ion components.

Means of Solving the Problem

As a result of intensive studies to solve the above-mentioned problems, the present inventors have found that a multilayer tube has a layer containing an aliphatic polyamide composition and a layer containing a modified polyolefin having a melting point over a predetermined temperature, wherein the aliphatic polyamide composition has a predetermined range of a bending elastic modulus by containing an aliphatic polyamide having a predetermined range of a methylene group/amide group number ratio and an elastomer polymer having a constituent unit derived from a carboxyl group and/or acid anhydride group-containing unsaturated compound, and as necessary, by containing a plasticizer having a certain structure, and the thickness of the layer containing the aliphatic polyamide composition is over a predetermined ratio based on the total thickness of the tube, and thereby the multilayer tube has excellent low temperature impact resistance, breakage pressure strength at high temperature, flexibility, dimensional stability, and elution resistance of low molecular weight substances and ion components.

Therefore, the present invention is a multilayer tube comprising two or more layers containing a layer (a) and a layer (b);
wherein
the layer (a) contains an aliphatic polyamide composition (A);
the layer (b) contains a modified polyolefin (B);
the aliphatic polyamide composition (A) contains a polyamide (A1) and an elastomer polymer (A2);
the polyamide (A1) is an aliphatic polyamide having a ratio of a number of methylene groups to a number of amide groups of 7.0 or more, and is contained in the aliphatic polyamide composition (A) in an amount of 55 mass % or more and 95 mass % or less;
the elastomer polymer (A2) has a constituent unit derived from an unsaturated compound having a carboxyl group and/or an acid anhydride group, and is contained in the aliphatic polyamide composition (A) in an amount of 5 mass % or more and 30 mass % or less;

the aliphatic polyamide composition (A) may contain a plasticizer (A3);
the plasticizer (A3) has no sulfur atom, and has an ester structure of p- and/or o-hydroxybenzoic acid and a linear and/or branched alkylaliphatic alcohol having alcohol having a carbon atom number of 12 to 24, and the content of the plasticizer (A3) in the aliphatic polyamide composition (A) is 0 mass % or more and 15 mass % or less;
the aliphatic polyamide composition (A) has a bending elastic modulus of 400 MPa or more and 1,000 MPa or less as measured in compliance with ISO 178;
the modified polyolefin (B) has a unit derived from a monomer based on an α-olefin having a carbon atom number of 2 to 10, and has a melting point of 130° C. or more as measured in compliance with ISO 11357-3;
in the multilayer tube, the layer (a) and the layer (b) are arranged in the order from the outside to the inside of the multilayer tube; and
the thickness of the layer (a) occupies 60% or more of the total thickness of the tube.

Preferred embodiments of the multilayer tube will be described as follows. A plurality of preferred embodiments can be combined.

(1) The multilayer tube according to claim 1, wherein the polyamide (A1) is at least one kind of a homopolymer selected from the group consisting of polyundecanamide (Polyamide 11), polydodecamide (Polyamide 12), polyhexamethylene decamide (Polyamide 610), polyhexamethylene dodecamide (Polyamide 612), polydecamethylene decamide (Polyamide 1010), polydecamethylene dodecamide (Polyamide 1012), and polydodecamethylene dodecamide (Polyamide 1212), and/or a copolymer using several kinds of raw material monomers forming thereof.

(2) The multilayer tube, wherein the relationship [A]>[B]+5 is satisfied when a terminal amino group concentration of the polyamide (A1) per one gram is expressed as [A] (µeq/g), and a terminal carboxyl group concentration of the polyamide (A1) per one gram is expressed as [B] (µeq/g).

(3) The multilayer tube, wherein the modified polyolefin (B) has a unit derived from an unsaturated compound containing at least one functional group selected from the group consisting of carboxyl group or derivatives thereof, hydroxyl group, epoxy group, amino group, amide group, imide group, nitrile group, thiol group, and isocyanate group.

(4) The multilayer tube, wherein the modified polyolefin (B) is produced by a method comprising: melting a pre-modified polyolefin; adding the unsaturated compound containing the functional group to the pre-modified polyolefin to form a mixture; and graft-copolymerizing the mixture.

(5) The multilayer tube, wherein the modified polyolefin (B) has an MFR value of 1.0 g/10 min to 10.0 g/10 min as measured in compliance with ISO 1133 under conditions of 230° C. and 2,160 g.

(6) The multilayer tube, wherein the modified polyolefin (B) has a density of 0.85 g/cm$^3$ or more as measured in compliance with ISO 1183-3.

(7) The multilayer tube, wherein the modified polyolefin (B) is a maleic anhydride-modified polypropylene, and the polypropylene content is 50 mass % or more.

(8) The multilayer tube, further comprising a layer (c);
wherein the layer (c) contains a polyolefin (C); and
the polyolefin (C) has a unit derived from a monomer based on an α-olefin having a carbon atom number of 2 to 10, and has a melting point of 120° C. or more as measured in compliance with ISO 11357-3, a tensile yield stress of 20 MPa or more as measured in compliance with ISO 527, and Charpy impact strength (notched) at 23° C. of 40 kJ/m² or more as measured in compliance with ISO 179/1 eA.

(9) The multilayer tube, wherein the layer (c) is disposed on an inner side of the layer (b).

(10) The multilayer tube, produced by co-extrusion molding.

(11) The multilayer tube, being a coolant (LLC) cooler tube, a urea solution transporting tube, a tube for battery cooling and heating, or a tube for air conditioner.

Effect of the Invention

According to the present invention, the multilayer tube having excellent low temperature impact resistance, breakage pressure strength at high temperature, flexibility, dimensional stability, and elution resistance of low molecular weight substances and ion components can be provided.

MODE FOR CARRYING OUT THE INVENTION

The multilayer tube of the present invention is a multilayer tube comprising two or more layers containing a layer (a) and a layer (b);
wherein
the layer (a) contains an aliphatic polyamide composition (A);
the layer (b) contains a modified polyolefin (B);
the aliphatic polyamide composition (A) contains a polyamide (A1) and an elastomer polymer (A2);
the polyamide (A1) is an aliphatic polyamide having a ratio of a number of methylene groups to a number of amide groups of 7.0 or more, and is contained in the aliphatic polyamide composition (A) in an amount of 55 mass % or more and 95 mass % or less;
the elastomer polymer (A2) has a constituent unit derived from an unsaturated compound having a carboxyl group and/or an acid anhydride group, and is contained in the aliphatic polyamide composition (A) in an amount of 5 mass % or more and 30 mass % or less;
the aliphatic polyamide composition (A) may contain a plasticizer (A3);
the plasticizer (A3) has no sulfur atom, and has an ester structure of p- and/or o-hydroxybenzoic acid and a linear and/or branched alkylaliphatic alcohol having alcohol having a carbon atom number of 12 to 24, and the content of the plasticizer (A3) in the aliphatic polyamide composition (A) is 0 mass % or more and 15 mass % or less;
the aliphatic polyamide composition (A) has a bending elastic modulus of 400 MPa or more and 1,000 MPa or less as measured in compliance with ISO 178;
the modified polyolefin (B) has a unit derived from a monomer based on an α-olefin having a carbon atom number of 2 to 10, and has a melting point of 130° C. or more as measured in compliance with ISO 11357-3;
in the multilayer tube, the layer (a) and the layer (b) are arranged in the order from the outside to the inside of the multilayer tube; and
the thickness of the layer (a) occupies 60% or more of the total thickness of the tube.

1. Layer (a)

The layer (a) of the multilayer tube according to the present invention contains the aliphatic polyamide composition (A).

<Aliphatic Polyamide Composition (A)>

The aliphatic polyamide composition (A) contains the polyamide (A1) and the elastomer polymer (A2), the polyamide (A1) is the aliphatic polyamide having the ratio of the number of methylene groups to the number of amide groups of 7.0 or more, and is contained in the aliphatic polyamide composition (A) in an amount of 55 mass % or more and 95 mass % or less, the elastomer polymer (A2) has a constituent unit derived from an unsaturated compound having a carboxyl group and/or an acid anhydride group, and is contained in the aliphatic polyamide composition (A) in an amount of 5 mass % or more and 30 mass % or less, the aliphatic polyamide composition (A) may contain the plasticizer (A3) as necessary, the plasticizer (A3) has no sulfur atom, and has the ester structure of p- and/or o-hydroxybenzoic acid and the linear and/or branched alkylaliphatic alcohol having alcohol having the carbon atom number of 12 to 24, and the content of the plasticizer (A3) in the aliphatic polyamide composition (A) is 0 mass % or more and 15 mass % or less, the aliphatic polyamide composition (A) has the bending elastic modulus of 400 MPa or more and 1,000 MPa or less as measured in compliance with ISO 178. (Hereinafter, the aliphatic polyamide composition may be simply referred as "aliphatic polyamide composition (A)".)

[Polyamide (A1)]

The polyamide (A1) is the aliphatic polyamide having the ratio of the number of methylene groups to the number of amide groups (hereinafter, may be referred as [CH$_2$]/[NHCO]) of 7.0 or more. (Hereinafter, the polyamide may be simply referred as "polyamide (A1)"). By using the aliphatic polyamide having [CH$_2$]/[NHCO] of 7.0 or more, the resulting multilayer tube can have excellent properties such as mechanical properties.

The polyamide (A1) has an amide bond (—CONH—) in the main chain, and is obtained by polymerizing or copolymerizing an aliphatic lactam, an aliphatic aminocarboxylic acid, or an aliphatic diamine with an aliphatic dicarboxylic acid as raw materials by a known method including melt polymerization, solution polymerization, and solid-phase polymerization.

Examples of the aliphatic lactam include caprolactam, enantholactam, undecanelactam, dodecanelactam, α-pyrrolidone, and α-piperidinone. Examples of the aliphatic aminocarboxylic acid include 6-aminocaproic acid, 7-aminoheptanoic acid, 9-aminononanoic acid, 11-aminoundecanoic acid, and 12-aminododecanoic acid. One type or two or more types thereof can be used.

Examples of the aliphatic diamine include 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, 1,20-eicosanediamine, 2-methyl-1,5-pentanediamine, 3-methyl-1,5-pentanediamine, 2-methyl-1,8-octanediamine, 2,2,4-trimethyl-1,6-hexanediamine, 2,4,4-trimethyl-1,6-hexanediamine and 5-methyl-1,9-nonanediamine. One type or two or more types thereof can be used.

Examples of the aliphatic diarboxylic acid include glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid and eicosanedioic acid. One type or two or more types thereof can be used.

Examples of the polyamide (A1) include a homopolymer such as polyundecanamide (Polyamide 11), polydodecamide (Polyamide 12), polytetramethylene dodecamide (Polyamide 412), polypentamethylene dodecamide (Polyamide 512), polyhexamethylene dodecamide (Polyamide 612), polyhexamethylene tetradecamide (Polyamide 614), polyhexamethylene hexadecamide (Polyamide 616), polyhexamethylene octadecamide (Polyamide 618), polynonamethylene adipamide (Polyamide 96), polynonamethylene suberamide (Polyamide 98), polynonamethylene azelamide (Polyamide 99), polynonamethylene sebacamide (Polyamide 910), polynonamethylene dodecamide (Polyamide 912), polydecamethylene adipamide (Polyamide 106), polydecamethylene suberamide (Polyamide 108), polydecamethylene azelamide (Polyamide 109), polydecamethylene sebacamide (Polyamide 1010), polydecamethylene dodecamide (Polyamide 1012), polydodecamethylene adipamide (Polyamide 126), polydodecamethylene suberamide (Polyamide 128), polydodecamethylene azelamide (Polyamide129), polydodecamethylene sebacamide (Polyamide 1210), and polydodecamethylene dodecamide (Polyamide 1212), and a copolymer using two or more raw material monomers forming thereof.

Among them, as the polyamide (A1), at least one homopolymer selected from the group consisting of polyundecanamide (Polyamide 11), polydodecamide (Polyamide 12), polyhexamethylene decamide (Polyamide 610), polyhexamethylene dodecamide (Polyamide 612), polydecamethylene decamide (Polyamide 1010), polydecamethylene dodecamide (Polyamide 1012), and polydodecamethylene dodecamide (Polyamide 1212), and/or a copolymer using two or more raw material monomers forming thereof is preferably used from the viewpoint of adequately ensuring various properties such as mechanical properties or heat resistance of the resulting multilayer tube, economy and ease of availability.

For example, the polyamide (A1) is the aliphatic polyamide having the ratio of the number of methylene groups to a number of amide groups of 7.0 or more, in which $[CH_2]/[NHCO]$ is 10.0 for the polyundecanamide (Polyamide 11), $[CH_2]/[NHCO]$ is 11.0 for polydodecamide (Polyamide 12), $[CH_2]/[NHCO]$ is 7.0 for polyhexamethylene decamide (Polyamide 610), $[CH_2]/[NHCO]$ is 8.0 for polyhexamethylene dodecamide (Polyamide 612), $[CH_2]/[NHCO]$ is 9.0 for polydecamethylene sebacamide (Polyamide 1010), $[CH_2]/[NHCO]$ is 10.0 for polydecamethylene dodecamide (Polyamide 1012), $[CH_2]/[NHCO]$ is 11.0 for polydodecamethylene dodecamide (Polyamide 1212).

Examples of devices used to produce the polyamide (A1) include known polyamide production devices such as batch-type reactors, single-tank and/or multi-tank continuous reactors, tubular continuous reactors and kneading reaction extruders such as single-screw kneading extruders or twin-screw kneading extruders. A known polymerization method such as melt polymerization, solution polymerization or solid phase polymerization can be used for the polymerization method, and polymerization can be carried out by repeating normal pressure, reduced pressure and increased pressure operations. These polymerization methods can be used alone or suitably used in combination.

In addition, the relative viscosity of the polyamide (A1) as measured in compliance with JIS K-6920 under conditions of 96% sulfuric acid, a polymer concentration of 1% and 25° C. is preferably 1.5 or more and 5.0 or less and more preferably 2.0 or more and 4.5 or less from the viewpoints of ensuring mechanical properties of the resulting multilayer tube and ensuring preferable processability of the multilayer tube over the proper range of viscosity when melted.

The polyamide (A1) preferably satisfies the relationship $[A]>[B]+5$, more preferably satisfies the relationship $[A]>[B]+10$, and even more preferably satisfies the relationship $[A]>[B]+15$, from the viewpoints of adequately ensuring interlayer adhesion of the multilayer tube and durability thereof when the concentration of terminal amino groups per g of the polyamide is defined as $[A]$ (μeq/g) and the concentration of terminal carboxyl groups per g of the polyamide is defined as $[B]$ (μeq/g) (to also be referred to as the terminal-modified aliphatic polyamide). Moreover, it is preferable that $[A]>20$, and more preferable that $30<[A]<120$, from the viewpoints of melt stability of the polyamide and inhibition of the formation of gelatinous materials.

Furthermore, the concentration of terminal amino groups $[A]$ (μeq/g) can be measured by dissolving the polyamide in a mixed solution of phenol and methanol and titrating with 0.05 N hydrochloric acid. The concentration of terminal carboxyl groups $[B1]$ (μeq/g) can be measured by dissolving the polyamide in benzyl alcohol and titrating with a 0.05 N sodium hydroxide solution.

The polyamide(A1) is produced by polymerizing or copolymerizing the aforementioned polyamide raw materials in the presence of an amine using a known method such as melt polymerization, solution polymerization or solid phase polymerization. Alternatively, terminal-modified aliphatic polyamide is produced by melt-kneading in the presence of an amine following polymerization. In this manner, although an amine can be added at an arbitrary stage during polymerization or at an arbitrary stage during melt-kneading following polymerization, when considering the interlayer adhesion of the multilayer tube, the amine is preferably added at an arbitrary stage during polymerization.

Examples of the aforementioned amine include monoamine, diamine, triamine and polyamine. In addition, carboxylic acid such as monocarboxylic acid, dicarboxylic acid or tricarboxylic acid may also be added as necessary in addition to amine provided they do not result in deviation from the ranges of the terminal group concentration conditions described above. These amines and carboxylic acids may be added simultaneously or separately. In addition, one type or two or more types of the amines and carboxylic acids exemplified below can be used.

Specific examples of monoamine added include aliphatic monoamine such as methylamine, ethylamine, propylamine, butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, octadecylamine, octadecyleneamine, eicosylamine or docosylamine, alicyclic monoamine such as cyclohexylamine or methylcyclohexylamine, aromatic monoamines such as benzylamino or β-phenylmethylamine, symmetrical secondary amines such as N,N-dimethylamine, N,N-diethylamine, N,N-dipropylamine, N,N-dibutylamine, N,N-dihexylamine or N,N-dioctylamine, and mixed secondary amines such as N-methyl-N-ethylamine, N-methyl-N-butylamine, N-methyl-N-dodecylamine, N-methyl-N-octadecylamine, N-ethyl-N-hexadecylamine, N-ethyl-N-octadecylamine, N-propyl-N-hexadecylamine or N-propyl-N-benzylamine. One type or two or more types thereof can be used.

Specific examples of diamine added include aliphatic diamines such as 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16- hexadecanediamine, 1,17-heptadecanediamine, 1,18-octadecanediamine, 2-methyl-1,5-pentanediamine, 3-methyl-1,5-pentanediamine, 2-methyl-1,8-octanediamine, 2,2,4-trimethyl-1,6-hexanediamine, 2,4,4-trimethyl-1,6-hexanediamine or 5-methyl-1,9-nonanediamine, alicyclic diamines such as 1,3-bis(aminomethyl)cyclohexane, 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl)propane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, 2,5-bis(aminomethyl)norbornane, 2,6-bis(aminomethyl)norbornane, 3,8-bis(aminomethyl)tricyclodecane or 4,9-bis(aminomethyl)tricyclodecane, and aromatic diamines such as m-xylylenediamine or p-xylylenediamine. One type or two or more types thereof can be used.

Specific examples of triamine or tetramine added include 1,2,3-triaminopropane, 1,2,3-triamino-2-methylpropane, 1,2,4-triaminobutane, 1,2,3,4-tetraminobutane, 1,3,5-tetraminocyclohexane, 1,2,4-triaminocyclohexane, 1,2,3-triaminocyclohexane, 1,2,4,5-tetraminocyclohexane, 1,3,5-triaminobenzene, 1,2,4-triaminobenzene, 1,2,3-triaminobenzene, 1,2,4,5-tetraminobenzene, 1,2,4-triaminonaphthalene, 2,5,7-triaminonaphthalene, 2,4,6-triaminopyridine, 1,2,7,8-tetraminonaphthalene and 1,4,5,8-tetraminonaphthalene. One type or two or more types thereof can be used.

The polyamine added are only required to be compounds that have a plurality of primary amino groups (—NH$_2$) and/or secondary amino groups (—NH—), and examples thereof include polyalkyleneimine, polyalkylene polyamine, polyvinylamine and polyallylamine. Amino groups provided with an active hydrogen serve as the reactive sites of polyamine.

Polyalkyleneimine are produced by a method in which an alkyleneimine such as ethyleneimine or propyleneimine is subjected to ionic polymerization, or a method in which an alkyloxazoline is polymerized followed by partially hydrolyzing or completely hydrolyzing the polymer. Examples of polyalkylene polyamines include diethylenetriamine, triethylenetetramine, pentaethylenehexamine and reaction products of ethylenediamine and a polyfunctional compound. Polyvinylamines are obtained by, for example, polymerizing N-vinylformamide to obtain poly(N-vinylformamide) followed by partially hydrolyzing or completely hydrolyzing the polymer with an acid such as hydrochloric acid. Polyallylamine is typically obtained by polymerizing a hydrochloride of an allylamine monomer followed by removing the hydrochloric acid. One type or two or more types thereof can be used. Among these, polyalkyleneimine is preferable.

Examples of polyalkyleneimine include homopolymers and copolymers obtained by polymerizing one type or two or more types of alkyleneimine having 2 to 8 carbon atoms, such as ethyleneimine, propyleneimine, 1,2-butyleneimine, 2,3-butyleneimine or 1,1-dimethylethyleneimine using an ordinary method. Among these, polyethyleneimine is more preferable. Polyalkyleneimine may be any of a branched polyalkyleneimine comprising a primary amine, secondary amine and tertiary amine obtained by using an alkyleneimine as raw material and subjecting to ring-opening polymerization, a linear polyalkyleneimine comprising only a primary amine and secondary amine obtained by using an alkyloxazoline as raw material and subjecting to polymerization, or a polyalkyleneimine having a three-dimensional crosslinked structure. Further, the polyalkyleneimine may be one obtained by copolymerizing monomers of ethylenediamine, propylenediamine, diethylenetriamine, triethylenetetramine, tetraethylenepentamine, dipropylenetriamine, tripropylenetetramine, dihexamethylenetriamine, aminopropylethylenediamine, and bisaminopropylethylenediamine. In addition to a tertiary amino group, polyalkyleneimine normally have a primary amino group or secondary amino group (imino group) having an active hydrogen atom that is derived from the reactivity of active hydrogen atoms on the nitrogen atom contained therein.

There are no particular limitations on the number of nitrogen atoms in the polyalkyleneimine, and the number of nitrogen atoms is preferably 4 or more and 3,000 or less, more preferably 8 or more and 1,500 or less, and even more preferably 11 or more and 500 or less. In addition, the number-average molecular weight of the polyalkyleneimine is preferably 100 or more and 20,000 or less, more preferably 200 or more and 10,000 or less, and even more preferably 500 or more and 8,000 or less.

On the other hand, examples of carboxylic acid added include aliphatic monocarboxylic acid such as acetic acid, propionic acid, butyric acid, valeric acid, caproic acid, enanthic acid, caprylic acid, capric acid, pelargonic acid, undecanoic acid, lauric acid, tridecanoic acid, myristic acid, myristoleic acid, palmitic acid, stearic acid, oleic acid, linoleic acid, arachic acid, behenic acid or erucic acid, alicyclic monocarboxylic acid such as cyclohexanecarboxylic acid or methylcyclohexanecarboxylic acid, aromatic monocarboxylic acid such as benzoic acid, toluic acid, ethylbenzoic acid or phenylacetic acid, aliphatic dicarboxylic acid such as malonic acid, succinic acid, glutaric acid, adipic acid, pimelic acid, suberic acid, azelaic acid, sebacic acid, undecanedioic acid, dodecanedioic acid, hexadecanedioic acid, hexadecenedioic acid, octadecanedioic acid, octadecenedioic acid, eicosanedioic acid, eicosenedioic acid, docosanedioic acid, diglycolic acid, 2,2,4-trimethyladipic acid or 2,4,4-trimethyladipic acid, alicyclic dicarboxylic acids such as 1,3-cyclohexanedicarboxylic acid, 1,4-cyclohexanedicarboxylic acid or norbornanedicarboxylic acid, aromatic dicarboxylic acid such as terephthalic acid, isophthalic acid, phthalic acid, m-xylylenedicarboxylic acid, p-xylylenedicarboxylic acid, 1,4-naphthalenedicarboxylic acid, 2,6-naphthalenedicarboxylic acid or 2,7-naphthalenedicarboxylic acid, and tricarboxylic acid such as 1,2,4-butanetricarboxylic acid, 1,3,5-pentanetricarboxylic acid, 1,2,6-hexanetricarboxylic acid, 1,3,6-hexanetricarboxylic acid, 1,3,5-cyclohexanetricarboxylic acid or trimesic acid. One type or two or more types thereof can be used.

The amount of added amine used is suitably determined by a known method in consideration of the terminal amino group concentration, terminal carboxyl group concentration and relative viscosity of the terminal-modified aliphatic polyamide to be produced. Normally, the amount of amine added per mole of polyamide raw material (1 mole of monomer or monomer unit composing a repeating unit) is preferably 0.5 meq/mol or more and 20 meq/mol or less and more preferably 1.0 meq/mol or more and 10 meq/mol or less from the viewpoints of obtaining adequate reactivity and facilitating the production of polyamide having a desired viscosity (one equivalent (eq) of an amino group is the amount of amino group that forms an amide group by reacting at a 1:1 ratio with a carboxyl group).

In the polyamide (A1), a diamine and/or polyamine among the aforementioned examples of amine is preferably added during polymerization to satisfy the terminal group concentration conditions, and at least one type of compound selected from the group consisting of aliphatic diamines, alicyclic diamines and polyalkyleneimines is more preferably added from the viewpoint of inhibiting gelling.

In addition, the polyamide (A1) is preferably also a polyamide mixture composed of two or more types of polyamides having different terminal group concentrations provided the aforementioned terminal group concentrations are satisfied. In this case, the terminal amino group concentration and terminal carboxyl group concentration of the polyamide mixture is determined by the concentration of terminal amino groups and the concentration of terminal carboxyl groups of the polyamide that compose the mixture along with the blending ratios thereof.

[Elastomer Polymer (A2)]

The aliphatic polyamide composition (A) contains the elastomer polymer (A2) having the constituent unit derived from the unsaturated compound having the carboxyl group and/or the acid anhydride group. (Hereinafter, the polymer may be simply referred as "elastomer polymer (A2)").

Examples of the elastomer polymer (A2) include a copolymer such as an (ethylene and/or propylene)/α-olefin-based copolymer and an (ethylene and/or propylene)/(α, β-unsaturated carboxylic acid ester)-based copolymer. One type or two or more types thereof can be used.

The (ethylene and/or propylene)/α-olefin-based copolymer is a polymer obtained by copolymerizing ethylene and/or propylene and an α-olefin having a carbon atom number of 3 or more. Examples of the α-olefin having the carbon atom number of 3 or more include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4, 4-dimethyl-1-hexene, 4, 4-dimethyl-1-pentene, 4-ethyl-1-hexene, 3-ethyl-1-hexene, 9-methyl-1-decene, 11-methyl-1-dodecene, and 12-ethyl-1-tetradecene. One type or two or more types thereof can be used. Alternatively, the copolymer may be obtained by copolymerizing a polyene of a non-conjugated diene such as 1, 3-butadiene, 1, 4-pentadiene, 1, 4-hexadiene, 1, 5-hexadiene, 1, 4-octadiene, 1, 5-octadiene, 1, 6-octadiene, 1, 7-octadiene, 2-methyl-1, 5-hexadiene, 6-methyl-1, 5-heptadiene, 7-methyl-1, 6-octadiene, 4-ethylidene-8-methyl-1, 7-nonadiene, 4, 8-dimethyl-1, 4, 8-decatriene (DMDT), dicyclopentadiene, cyclohexadiene, cyclooctadiene, 5-vinylnorbornene, 5-ethylidene-2-norbornene, 5-methylene-2-norbornene, 5-isopropylidene-2-norbornene, 6-chloromethyl-5-isopropenyl-2-norbornene, 2, 3-diisopropylidene-5-norbornene, 2-ethylidene-3-isopropylidene-5-norbornene, and 2-propenyl-2, 5-norbornadiene. One type or two or more types thereof can be used.

The (ethylene and/or propylene)/(α, β-unsaturated carboxylic acid ester)-based copolymer is a copolymer obtained by copolymerizing ethylene and/or propylene and α, β-unsaturated carboxylic acid ester monomer. Examples of the α, β-unsaturated carboxylic acid ester monomer include methyl acrylate, methyl methacrylate, ethyl acrylate, ethyl methacrylate, propyl acrylate, propyl methacrylate, butyl acrylate, butyl methacrylate, pentyl acrylate, pentyl methacrylate, hexyl acrylate, hexyl methacrylate, heptyl acrylate, heptyl methacrylate, octyl acrylate, octyl methacrylate, nonyl acrylate, nonyl methacrylate, decyl acrylate, decyl methacrylate, 2-ethylhexyl acrylate, 2-ethylhexyl methacrylate, hydroxyethyl acrylate, hydroxyethyl methacrylate, monomethyl maleate, monomethyl itaconate, dimethyl maleate, and dimethyl itaconate. One type or two or more types thereof can be used.

Examples of the unsaturated compound having the carboxyl group in the elastomer polymer (A2) include an α, β-unsaturated carboxylic acid such as acrylic acid, methacrylic acid, maleic acid, fumaric acid, itaconic acid, crotonic acid, mesaconic acid, citraconic acid, glutaconic acid, cis-4-cyclohexene-1, 2-dicarboxylic acid, endo-bicyclo-[2.2.1]-5-heptene-2, 3-dicarboxylic acid, and metal salts of these carboxylic acids. Examples of the unsaturated compound having the acid anhydride group include a dicarboxylic anhydride having an α, β-unsaturated bond such as maleic anhydride, itaconic anhydride, citraconic anhydride, and endo-bicyclo-[2.2.1]-5-heptene-2, 3-dicarboxylic anhydride. One type or two or more types thereof can be used. Among them, the dicarboxylic anhydride having the α, β-unsaturated bond is preferred. Maleic anhydride and itaconic anhydride are more preferred.

The carboxyl group and/or acid anhydride group concentration in the elastomer polymer (A2) is preferably 25 μeq/g or more and 200 μeq/g or less, and more preferably 50 μeq/g or more and 150 μeq/g or less from the viewpoint of providing good compatibility with the polyamide (A1) and the flowability of the resulting aliphatic polyamide composition (A).

The carboxyl group and/or acid anhydride group concentration in the elastomer polymer (A2) can be measured by dissolving the elastomer polymer in toluene solution, further adding ethanol to the solution to prepare a sample solution, and titrating the sample solution with 0.1 N KOH ethanol solution using phenolphthalein as an indicator.

[Plasticizer (A3)]

The aliphatic polyamide composition (A) preferably contains the plasticizer (A3) from the viewpoint of providing flexibility to the resulting multilayer tube. The plasticizer (A3) has no sulfur atom, and has the ester structure of p- and/or o-hydroxybenzoic acid and the linear and/or branched alkylaliphatic alcohol having the carbon atom number of 12 to 24. (Hereinafter, the plasticizer may be simply referred as "plasticizer (A3)".)

The plasticizer (A3) is composed of an ester of p- and/or o-hydroxybenzoic acid and the linear and/or branched aliphatic alcohol having the carbon atom number of 12 to 24. The aliphatic alcohol which is the raw material of the ester may have a linear chain or a branched chain. Further, the carbon atom number of the aliphatic alcohol is preferably from 12 to 22. A saturated alcohol or an unsaturated alcohol can be used as long as the carbon atom number is from 12 to 22. The ester of the alcohol and hydroxybenzoic acid has good compatibility with the polyamide resin, provides less surface stickiness, and has low volatility and sufficient plasticization effect.

Examples of the plasticizer (A3) include dodecyl o-hydroxybenzoate, dodecyl p-hydroxybenzoate, tridecyl o-hydroxybenzoate, tridecyl p-hydroxybenzoate, tetradecyl o-hydroxybenzoate, tetradecyl p-hydroxybenzoate, pentadecyl o-hydroxybenzoate, pentadecyl p-hydroxybenzoate, hexadecyl o-hydroxybenzoate, hexadecyl p-hydroxybenzoate, heptadecyl o-hydroxybenzoate, heptadecyl p-hydroxybenzoate, octadecyl o-hydroxybenzoate, octadecyl p-hydroxybenzoate, nonadecyl o-hydroxybenzoate, nonadecyl p-hydroxybenzoate, icosyl o-hydroxybenzoate, icosyl p-hydroxybenzoate, henicosyl o-hydroxybenzoate, henicosyl p-hydroxybenzoate, docosyl o-hydroxybenzoate, docosyl p-hydroxybenzoate, tricosyl o-hydroxybenzoate, tricosyl p-hydroxybenzoate, tetracosyl o-hydroxybenzoate, tetracosyl p-hydroxybenzoate, hexyldecyl o-hydroxybenzoate, hexyldecyl p-hydroxybenzoate, ethyldecyl o-hydroxybenzoate, ethyldecyl p-hydroxybenzoate, ethyldodecyl o-hydroxybenzoate, ethyldodecyl p-hydroxybenzoate, octyloctyl o-hydroxybenzoate, octyloctyl p-hydroxybenzoate, octyldodecyl o-hydroxybenzoate, octyldodecyl p-hydroxybenzoate, decyldecyl o-hydroxybenzoate, decyldecyl p-hydroxybenzoate, decyldodecyl o-hydroxybenzoate, and decyldodecyl p-hydroxybenzoate. One type or two or more types thereof can be used. Among them, 2-hexyldecyl p-hydroxybenzoate ester (HDPB) and hexadecyl p-hydroxybenzoate ester (CEPB) are preferred.

The content of the polyamide (A1) in the aliphatic polyamide composition (A) is from 55 mass % or more and 95% or less, preferably from 60 mass % or more and 95 mass % or less, and more preferably from 70% or more and 89% or less based on 100 mass % of the aliphatic polyamide composition (A). When the content of the polyamide (A1) is within the ranges, the resulting multilayer tube can have sufficient excellent properties such as breakage pressure strength at high temperature. On the contrary, when the content of the polyamide (A1) is less than the lower limit described above, the multilayer tube cannot have sufficient breakage pressure strength at high temperature. On the other hand, when the content of the polyamide (A1) is more than the upper limit described above, the multilayer tube cannot have sufficient flexibility and low temperature impact resistance.

The content of the elastomer polymer (A2) in the aliphatic polyamide composition (A) is 5 mass % or more and 30 mass % or less, preferably 7 mass % or more and 25 mass % or less, and more preferably 10 mass % or more and 20 mass % or less based on 100 mass % of the aliphatic polyamide composition (A). When the content of the elastomer polymer (A2) is within the ranges, the resulting multilayer tube can have excellent flexibility and the low temperature impact resistance while maintaining mechanical properties of the multilayer tube. On the contrary, when the content of the elastomer polymer (A2) is less than the lower limit described above, the multilayer tube cannot have sufficient flexibility and low temperature impact resistance. On the other hand, when the content of the elastomer polymer (A2) is more than the upper limit described above, the multilayer tube cannot have sufficient breakage pressure strength at high temperature and other mechanical properties.

The content of the plasticizer (A3) in the aliphatic polyamide composition (A) is 0 mass % or more and 15 mass % or less, and preferably from 1 mass % or more and 10 mass % or less based on 100 mass % of the aliphatic polyamide composition (A). When the content of the plasticizer (A3) is within the suitable ranges, the resulting multilayer tube can have excellent flexibility while maintaining breakage pressure strength at high temperature of the multilayer tube. On the contrary, when the content of the plasticizer (A3) is more than the upper limit described above, the multilayer tube may not have sufficient breakage pressure strength at high temperature.

The aliphatic polyamide composition (A) has a bending elastic modulus of 400 MPa or more and 1,000 MPa or less as measured in compliance with ISO 178. The bending elastic modulus is preferably 450 MPa or more and 950 Pa or less, and more preferably 500 MPa or more and 900 MPa or less. When the bending elastic modulus of the aliphatic polyamide composition (A) is within the ranges, the resulting multilayer tube can have excellent flexibility while maintaining breakage pressure strength at high temperature of the multilayer tube. The bending elastic modulus of the aliphatic polyamide composition (A) can be adjusted by suitably changing the added amount of the elastomer polymer (A2) and optionally the plasticizer (A3).

Production method of the aliphatic polyamide composition (A) is not particularly limited. Various additives can be blended as necessary, and various method known in the art can be adopted. For example, the aliphatic polyamide composition (A) can be produced by a method of dry blending the polyamide (A1), the elastomer polymer (A2), and the plasticizer (A3) and optionally added other components as pellets at the mixing ratio as described above with a tumbler or a mixer homogenously, a method of previously dry blending, and then melting and kneading the polyamide (A1), the elastomer polymer (A2), and the plasticizer (A3) and optionally added other components, and a method of previously dry blending, and separately feeding, and melting and kneading the polyamide (A1), the elastomer polymer (A2), and the plasticizer (A3) and optionally added other components. Melting and kneading can be performed with a kneading machine such as a single screw extruder, a twin screw extruder, a kneader, and Banbury mixer.

Further, an antioxidant, a heat stabilizer, a UV absorber, a light stabilizer, a lubricant, an inorganic filler, an antistatic agent, a flame retardant, a crystallization accelerator, or a colorant may be added to the aliphatic polyamide composition (A) as necessary.

2. Layer (b)

The layer (b) of the multilayer tube according to the present invention contains the modified polyolefin (B).

The modified polyolefin (B) has the unit derived from the monomer based on the α-olefin having the carbon atom number of 2 to 10, and has a melting point of 130° C. or more as measured in compliance with ISO 11357-3. (Hereinafter, the polyolefin may be simply referred as "modified polyolefin (B)").

The polyolefin (B1) constituting the modified polyolefin (B) is a polymer having the unit derived from the monomer based on the α-olefin having the carbon atom number of 2 to 10 as the main component, and is preferably a polymer having the unit derived from a monomer based on α-olefin having the carbon atom number of 2 to 8 as the main component. When the carbon atom number of the unit derived from the monomer based on the α-olefin in the modified polyolefin (B) is within the ranges, the resulting multilayer tube can have especially excellent elution resistance of low molecular weight substances and ion components. When the polyolefin (B) is a copolymer, the content of the unit derived from the monomer based on the α-olefin having the carbon atom number of 2 to 10 which is the main component is preferably 60 mol % or more, more preferably 70 mol % or more, and further preferably 90 mol % or more based on 100 mol % of the total polymerization units. When the content of the unit derived from the monomer based on the α-olefin having the carbon atom number of 2 to 10 is over the value described above, the resulting multilayer tube can have further excellent elution resistance of low molecular weight substances and ion components while having sufficient flexibility.

Examples of the monomer based on the α-olefin having the carbon atom number of 2 to 10 include ethylene, propylene, 1-butene, 1-pentene, 1-hexene, 1-heptene, 1-octene, 1-nonene, 1-decene, 2-butene, 3-methyl-1-butene, 3-methyl-1-pentene, 3-ethyl-1-pentene, 4-methyl-1-pentene, 4, 4-dimethyl-1-pentene, 4-methyl-1-hexene, 4, 4-dimethyl-1-hexene, 4, 4-dimethyl-1-pentene, 4-ethyl-1-hexene, and 3-ethyl-1-hexene. One type or two or more types thereof can be used. Among them, the monomer based on the α-olefin having the carbon atom number of 2 to 8 is preferred.

Within the range not detracting various excellent properties of the resulting multilayer tube, other monomers other than the monomer based on the α-olefin having the carbon atom number of 2 to 10, for example, styrenes, non-conjugated dienes, cyclic olefins, and oxygen atom-containing olefins, may be included. Examples of styrenes include styrene, o-methylstyrene, m-methylstyrene, p-methylstyrene, 1, 5-dimethyl styrene, 2, 4-dimethyl styrene, vinylnaphthalene, vinylanthracene, 4-propylstyrene, 4-cyclohexylstyrene, 4-dodecylstyrene, 2-ethyl-4-benzylstyrene, and 4-(phenylbutyl)styrene. Examples of non-conjugated dienes include 1, 3-butadiene, 1, 4-pentadiene, 1, 4-hexadiene, 1, 5-hexadiene, 1, 4-octadiene, 1, 5-octadiene, 1, 6-octadiene, 1, 7-octadiene, 2-methyl-1, 5-hexadiene, 6-methyl-1, 5-heptadiene, 7-methyl-1, 6-octadiene, 4-ethylidene-8-methyl-1, 7-nonadiene, 4, 8-dimethyl-1, and 4, 8-decatriene (DMDT). Examples of cyclic olefins include dicyclopentadiene, cyclohexadiene, cyclooctadiene, 5-vinylnorbornene, 5-ethylidene-2-norbornene, 5-methylene-2-norbornene, 5-isopropylidene-2-norbornene, 6-chloromethyl-5-isopropenyl-2-norbornene, 2, 3-diisopropylidene-5-norbornene, 2-ethylidene-3-isopropylidene-5-norbornene, and 2-propenyl-2, 5-norbornadiene. Examples of oxygen atom-containing olefins include hexenol, hexenoic acid, and methyl octenoate. The content of the unit derived from other monomers is preferably less than 40 mol %, more preferably less than 30 mol %, and further preferably less than 10 mol % based on 100 mol % of the total polymerization units.

As the polyolefin (B1), a crystalline polyolefin such as an α-olefin copolymer of polyethylene, polypropylene, polybutene-1, poly(4-methylpentene-1), ethylene, propylene, 1-butene, or 4-methylpentene-1 and a copolymerizable monomer is preferred. One type or two or more types thereof can be used. Among them, a polypropylene homopolymer, or an α-olefin random copolymer of propylene and 20 mol % or less of other α-olefins, and a block copolymer of propylene and 30 mol % or less of other α-olefins are more preferred.

Production of the polyolefin (B1) can be performed by a method traditionally known in the art. For example, polymerization can be performed by using a catalyst such as a titanium catalyst, a vanadium-based catalyst, and a metallocene catalyst. Further, the polyolefin (B1) may be a form of resin and elastomer. The polyolefin (B1) having an isotactic structure or a syndiotactic structure may be used, and the stereoregularity is not particularly limited. When the polyolefin (B1) is the copolymer, it may be an alternating copolymer, a random copolymer, or a block copolymer.

Also, the modified polyolefin (B) has a melting point of 130° C. or more as measured in compliance with ISO 11357-3, and preferably 145° C. or more. When the melting point of the modified polyolefin (B) is over the value described above, the resulting multilayer tube has excellent breakage pressure strength at high temperature and long-period resistance to chemical liquids.

The modified polyolefin (B) preferably has the unit derived from the unsaturated compound containing at least one functional group selected from the group consisting of carboxyl group or derivatives thereof, hydroxyl group, epoxy group, amino group, amide group, imide group, nitrile group, thiol group, and isocyanate group. By containing the unit derived from the unsaturated compound containing the functional group described above in the modified polyolefin (B), the interlayer adhesion between the layer (a) and the layer (b) in the resulting multilayer tube can be increased.

Examples of the unsaturated compound having the carboxyl group include an unsaturated carboxylic acid such as acrylic acid, methacrylic acid, maleic acid, fumaric acid, tetrahydrophthalic acid, itaconic acid, citraconic acid, crotonic acid, isocrotonic acid, norbornene dicarboxylic acid, and bicyclo[2, 2, 1]hepto-2-en-5, 6-dicarboxylic acid, or derivatives thereof (for example, acid anhydrides, acid halides, amides, imides, and esters). One type or two or more types thereof can be used.

Examples of the derivative of the unsaturated compound having the carboxyl group include malenyl chloride, malenylimide, maleic anhydride, itaconic anhydride, citraconic anhydride, tetrahydrophthalic anhydride, bicyclo[2, 2, 1]hepto-2-en-5, 6-dicarboxylic anhydride, dimethyl maleate, monomethyl maleate, diethyl maleate, diethyl fumarate, dimethyl itaconate, diethyl citraconate, dimethyl tetrahydrophthalate, and dimethyl bicyclo[2, 2, 1]hepto-2-en-5, 6-dicarboxylate. One type or two or more types thereof can be used.

Examples of the unsaturated compound having the hydroxyl group include a hydroxyl group-containing (meth) acrylate ester such as hydroxyethyl acrylate, hydroxyethyl methacrylate, hydroxypropyl acrylate, hydroxypropyl methacrylate, glycerin mono(meth)acrylate, and pentaerythritol mono(meth)acrylate, and 10-undecene-1-ol, 1-octene-3-ol, a glycerin monoallyl ether, an allyl alcohol, 2-butene-1, 4-diol, and a glycerin monoalcohol. One type or two or more types thereof can be used.

Examples of the unsaturated compound having the epoxy group include a glycidyl ester of an unsaturated carboxylic acid such as glycidyl acrylate and glycidyl methacrylate, a monoglycidyl ester of an unsaturated dicarboxylic acid such as maleic acid and fumaric acid (when it is the monoglycidyl ester, the carbon atom number of the alkyl group is from 1 to 12), an alkylglycidyl ester of p-styrenecarboxylic acid, 2-methyl allylglycidyl ether, 3, 4-epoxy-1-butene, 3, 4-epoxy-3-methyl-1-butene, 3, 4-epoxy-1-pentene, 3, 4-epoxy-3-methyl-1-pentene, 5, 6-epoxy-1-hexene, and vinylcyclohexene monooxide. One type or two or more types thereof can be used.

Examples of the unsaturated compound having the amino group include an aminoalkyl acrylate or methacrylate ester-based derivative such as aminomethyl acrylate, aminomethyl methacrylate, dimethyl aminoethyl methacrylate, aminopropyl acrylate, aminopropyl methacrylate, and cyclohexylaminoethyl methacrylate, and a vinylamine-based derivative such as N-vinyldiethylamine and N-acetyl vinylamine. One type or two or more types thereof can be used.

Examples of the unsaturated compound having the amide group include an acrylamide-based derivative such as acrylamide, methacrylamide, N-methylacrylamide, N, N-dimethyl acrylamide, and N, N-dimethyl aminopropylacrylamide. One type or two or more types thereof can be used.

Examples of the unsaturated compound having the imide group include N-acryloyloxyethyl-1, 2, 3, 6-tetrahydrophthalimide (manufactured by TOAGOSEI CO., LTD., trade name: Alonix TO-1428), N-acryloyloxyethylhexahydrophthalimide (manufactured by TOAGOSEI CO., LTD., trade name: Alonix TO-1429), and N-acryloyloxyethyl-3, 4, 5, 6-tetrahydrophthalimide (manufactured by TOAGOSEI CO., LTD., trade name: Alonix TO-1534). One type or two or more types thereof can be used.

Examples of the unsaturated compound having the nitrile group include acrylonitrile, methacrylonitrile, 5-hexenenitrile, 5-methyl-5-hexenenitrile, methyl-2-cyanoacrylate, ethyl-2-cyanoacrylate, butyl-2-cyanoacrylate, cyclohexyl-2-cyanoacrylate, 2-ethylhexyl-2-cyanoacrylate, and ethoxyethyl-2-cyanoacrylate. One type or two or more types thereof can be used.

Examples of the unsaturated compound having the thiol group include esters of a thiol group-containing compound such as an aliphatic or aromatic mercapto alcohol or ditiol, including 2-mercaptoethanol, ethanedithiol, 1, 2-propanedithiol, 1, 3-propanedithiol, parahydroxythiophenol, 3-mercapto-1, 2-propanedithiol, 1, 4-butanedithiol, 2-mercaptoethylether, and 2-mercaptoethylsulfide with an acrylic acid or methacrylic acid. One type or two or more types thereof can be used.

Examples of the unsaturated compound having the isocyanate group include 2-methacryloyloxyethyl isocyanate (manufactured by SHOWA DENKO K.K., trade name: Karenz MOI), and 2-acryloyloxyethyl isocyanate (manufactured by SHOWA DENKO K.K., trade name: Karenz AOI). One type or two or more types thereof can be used.

Among them, maleic anhydride, itaconic anhydride, citraconic anhydride, tetrahydrophthalic anhydride, endo-bicyclo-[2. 2. 1]-5-heptene-2, 3-dicarboxylic anhydride, acrylic acid, methacrylic acid, hydroxyethyl acrylate, hydroxyethyl methacrylate, glycidyl methacrylate, and aminopropyl methacrylate are preferred. A dicarboxylic anhydride such as maleic anhydride, itaconic anhydride, citraconic anhydride, tetrahydrophthalic anhydride, endo-bicyclo-[2.2.1]-5-heptene-2, 3-dicarboxylic anhydride is more preferred. Maleic anhydride is further preferred.

A method of introducing the unit derived from the unsaturated compound having the functional group described above to the polyolefin, a known method can be adopted. For example, a method of graft copolymerizing the unsaturated compound having the functional group described above to the polyolefin (B1), or a method of radical copolymerizing an olefin monomer and the unsaturated compound having the functional group described above can be exemplified. The method of graft copolymerizing the unsaturated compound having the functional group described above to the polyolefin (B1) is preferred.

For such a modified polyolefin (B), various known methods can be adopted for graft modifying the polyolefin (B1) with the unsaturated compound having the functional group described above. Examples include a method of graft copolymerizing by melting a pre-modified polyolefin and adding the unsaturated compound having the functional group described above, and a method of graft copolymerizing by dissolving in a solvent and adding a graft monomer. In each case, for efficiently graft polymerizing the unsaturated compound having the functional group described above, the reaction is preferably performed in the presence of a radical polymerization initiator.

The used radical polymerization initiator is not particularly limited as long as it accelerates the reaction between the main chain of the polyolefin and the unsaturated compound having the functional group described above. Organic peroxides and an organic peresters are preferred. Specific examples include benzoyl peroxide, dichlorobenzoyl peroxide, dicumyl peroxide, di-t-butyl peroxide, 2, 5-dimethyl-2, 5-di(peroxybenzoate)hexyne-3, 1, 4-bis(t-butylperoxyisopropyl)benzene, lauroyl peroxide, t-butyl peracetate, 2, 5-dimethyl-2, 5-di(t-butylperoxy)hexyne-3, 2, 5-dimethyl-2, 5-di(t-butylperoxide)hexane, t-butyl benzoate, t-butyl perphenylacetate, t-butyl perisobutyrate, t-butyl per-sec-octoate, t-butyl perpivalate, cumyl perpivalate, and t-butyl perdiethyl acetate. Other examples include an azo compound, for example, azobis-isobutylnitrile, and dimethyl azoisobutylnitrile. One type or two or more types thereof can be used. Among them, dialkyl peroxides such as dicumyl peroxide, di-t-butyl peroxide, 2, 5-dimethyl-2, 5-di(t-butylperoxy)hexyne-3, 2, 5-dimethyl-2, 5-di(t-butylperoxy) hexane, and 1, 4-bis(t-butylperoxyisopropyl)benzene is more preferred.

The radical polymerization initiator is preferred used in an amount of about 0.001 to 10 parts by mass based on 100 parts by mass of the polyolefin (B1). The graft amount of the unsaturated compound having the functional group described above is preferably 0.05 mass % or more and 20 mass % or less, more preferably 0.05 mass % or more and 10 mass % or less, further preferably 0.05 mass % or more and 5 mass % or less, and particularly preferably 0.05 mass % or more and 3 mass % or less based on 100 mass % of the polyolefin (B1). Note that the graft amount of the polyolefin (B1) is a net graft amount as measured after removing the unsaturated compound having the functional group described above from the polyolefin (B1). Further, the graft amount can be measured by a known means such as $^{13}$C-NMR and $^{1}$H-NMR measurement. When a monomer having an acidic functional group such as an unsaturated carboxylic acid and an acid anhydride thereof is used as the unsaturated compound having the functional group described above, as an indicative amount of the amount of the functional group introduced in the polyolefin (B1), for example, an acid number can be used. Alternatively, when maleic anhydride is used as the unsaturated compound having the functional group described above, the graft amount can be measured based on the adsorption spectrum of the carbonyl group in maleic anhydride which is typically detected about 1,780 to 1,790 cm$^{-1}$ using an infrared spectrophotometer.

The modified polyolefin (B) is preferably a maleic anhydride-modified polypropylene from the viewpoint of obtaining the multilayer tube having good mechanical properties, long-term resistance to chemical liquids and interlayer adhesion. The content of polypropylene in the maleic anhydride-modified polypropylene is preferably 50 mass % or more and 99.5 mass % or less, more preferably 60 mass % or more and 97 mass % or less, and further preferably from 70 mass % or more and 95 mass % or less based on 100 mass % of the maleic anhydride-modified polypropylene. When the content of polypropylene in the maleic anhydride-modified polypropylene is over the values described above, the resulting multilayer tube can have further excellent elution resistance of low molecular weight substances and ion components while having sufficient flexibility of the multilayer tube.

The modified polyolefin (B) preferably has an MFR value of 1.0 g/10 min or more and 10.0 g/10 min or less, and more preferably 1.5 g/10 min or more and 7.0 g/10 min or less as measured in compliance with ISO 1133 under condition of 230° C. and 2,160 g. When the MFR value of the modified polyolefin (B) is within the ranges, the processing stability of the resulting multilayer tube can be further increased.

Also, the modified polyolefin (B) preferably has a density of 0.85 g/cm$^3$ or more, and more preferably 0.85 g/cm$^3$ or more and 0.95 g/cm$^3$ or less as measured in compliance with ISO 1183-3. When the density of the modified polyolefin (B) is within the ranges, the resulting multilayer tube has sufficient excellent flexibility and breakage pressure strength.

Various additives may be included in the modified polyolefin (B) as necessary. Examples of the additives include a conductive filler, an antioxidant, a heat stabilizer, a UV absorber, a light stabilizer, a lubricant, an inorganic filler, an antistatic agent, a flame retardant, a crystallization accelerator, a plasticizer, a colorant, a lubricating agent, and other thermoplastic resins.

3. Layer (c)

Preferably, the multilayer tube further contains the layer (c). The layer (c) of the multilayer tube contains the polyolefin (C).

The polyolefin (C) has the unit derived from the monomer based on the α-olefin having the carbon atom number of 2 to 10, and has a melting point of 120° C. or more as measured in compliance with ISO 11357-3, a tensile yield stress of 20 MPa or more as measured in compliance with ISO 527, and Charpy impact strength (notched) at 23° C. of 40 kJ/m$^2$ or more as measured in compliance with ISO 179/1 eA. (Hereinafter, the polyolefin may be simply referred as "polyolefin (C)".)

The polyolefin (C) is a polymer having the unit derived from the monomer based on the α-olefin having the carbon atom number of 2 to 10 as the main component, and is preferably a polymer having the unit derived from the monomer based on the α-olefin having the carbon atom number of 2 to 8 as the main component. When the carbon atom number of the unit derived from the monomer based on the α-olefin in the polyolefin (C) is within the ranges, the resulting multilayer tube can have further excellent resistance to permeation of chemical liquids and long-term resistance to chemical liquids while having sufficient flexibility.

Example of the polyolefin (C) includes the polyolefin (B1) described in the description of the modified polyolefin (B). Among them, from the viewpoint of obtaining the multilayer tube having good mechanical properties and long-term resistance to chemical liquids, a homopolymer or a copolymer is preferred, including (1) an ethylene homopolymer (the production method may be a low pressure method or a high pressure method), (2) an ethylene/propylene copolymer containing 99 mol % or less and 80 mol % or more of ethylene and 1 mol % or more and 20 mol % or less of propylene, preferably an ethylene/propylene copolymer containing 95 mol % or less and 85 mol % or more of ethylene and 5 mol % or more and 15 mol % or less of propylene, (3) an ethylene/1-butene copolymer containing 99 mol % or less and 80 mol % or more of ethylene and 1 mol % or more and 20 mol % or less of 1-butene, preferably an ethylene/1-butene copolymer containing 95 mol % or less and 85 mol % or more of ethylene and 5 mol % or more and 15 mol % or less of 1-butene, (4) an ethylene/1-octene copolymer containing 99 mol % or more and 80 mol % or less of ethylene and 1 mol % or more and 20 mol % or less of 1-octene, preferably an ethylene/1-octene copolymer containing 97 mol % or more and 85 mol % or less of ethylene and 3 mol % or more and 15 mol % or less of 1-octene, (5) an ethylene-based copolymer such as a copolymer of ethylene and 10 mol % or less of other α-olefins (except for propylene, 1-butene, and 1-octene) or a vinyl monomer (for example, vinyl acetate, ethyl acrylate, and the like), (6) a propylene homopolymer, (7) a random copolymer of propylene and 30 mol % or less of other α-olefins, preferably a random copolymer of propylene and 20 mol % or less of other α-olefins, (8) a block copolymer of propylene and 40 mol % or less of other α-olefins, (9) a 1-butene homopolymer, (10) a random copolymer of 1-butene and 10 mol % or less of other α-olefins, (11) a 4-methyl-1-pentene homopolymer, and (12) a random copolymer of 4-methyl-1-pentene and 20 mol % or less of other α-olefins. More preferred are (6) a propylene homopolymer, (7) a random copolymer of propylene and 20 mol % or less of other α-olefins, (8) a block copolymer of propylene and 40 mol % or less of other α-olefins, (9) a 1-butene homopolymer, (10) a random copolymer of 1-butene and 10 mol % or less of other α-olefins, (11) a 4-methyl-1-pentene homopolymer, and (12) a random copolymer of 4-methyl-1-pentene and 20 mol % or less of other α-olefins.

The polyolefin (C) has a melting point of 120° C. or more, and preferably 125° C. or more as measured in compliance with ISO 11357-3. When the melting point of the polyolefin (C) is over the value described above, the resulting multilayer tube can have further excellent breakage pressure strength at high temperature and long-term resistance to chemical liquids.

Also, the polyolefin (C) has a tensile yield stress of 20 MPa or more, and preferably 25 MPa or more as measured in compliance with ISO 527. Further, the polyolefin (C) has Charpy impact strength (notched) at 23° C. of 40 kJ/m$^2$ or more, and preferably 45 kJ/m$^2$ or more as measured in compliance with ISO 179/1 eA. When the tensile yield stress and Charpy impact strength (notched) at 23° C. of the polyolefin (C) are the values described above or more, the resulting multilayer tube can have further excellent low temperature impact resistance and breakage pressure strength at high temperature.

Production of the polyolefin (C) can be performed by a method traditionally known in the art. For example, polymerization can be performed by using a catalyst such as a titanium catalyst, a vanadium-based catalyst, and a metallocene catalyst. Further, the polyolefin (C) may be a form of resin and elastomer. The polyolefin (C) having an isotactic structure or a syndiotactic structure may be used, and the stereoregularity is not particularly limited. When the polyolefin (C) is the copolymer, it may be an alternating copolymer, a random copolymer, or a block copolymer.

Various additives may be included in the modified polyolefin (C) as necessary. Examples of the additives include a conductive filler, an antioxidant, a heat stabilizer, a UV absorber, a light stabilizer, a lubricant, an inorganic filler, an antistatic agent, a flame retardant, a crystallization accelerator, a plasticizer, a colorant, a lubricating agent, and other thermoplastic resins.

[Multilayer Tube]

A first embodiment of the multilayer tube has two or more layers including the layer (a) and the layer (b), the layer (a) and the layer (b) are arranged in the order from the outside to the inside of the multilayer tube, and the thickness of the layer (a) occupies over 60% of the total thickness of the tube.

In the first embodiment of the multilayer tube, including the layer (a) is essential, and the multilayer tube having excellent mechanical properties, chemical resistance and flexibility can be obtained. Including the layer (b) is also essential, the multilayer tube has good barrier properties to chemical liquids, in particular, barrier properties to water vapor, a coolant (LLC), and a urea solution, and long-term resistance to chemical liquids. The thickness of the layer (a) in the multilayer tube occupies 60% or more and 95% or less of the total thickness of the tube, preferably 65% or more and 95% or less, and more preferably 70% or more and 85% or less of the total thickness of the tube. When the thickness of the layer (a) is within the ranges, various properties described above can be effectively exerted. The thickness of the layer (b) in the multilayer tube occupies more than 5% and less than 40% of the total thickness of the tube, preferably more than 10% and less than 35%, and more preferably more than 15% and less than 30% of the total thickness of the tube. When the thickness of the layer (b) is within the ranges, various properties described above can be effectively exerted.

In a preferred embodiment, the layer (a) and the layer (b) are contiguously arranged. From the arrangement, the multilayer tube having excellent interlayer adhesion can be obtained.

In a further preferred embodiment, the layer (a) is arranged at an outermost layer of the multilayer tube. By arranging the layer (a) at the outermost layer, the multilayer tube having excellent breakage pressure strength at high temperature can be obtained. The layer (b) is arranged at an innermost layer of the multilayer tube. By arranging the layer (b) at the innermost layer, the elution of low molecular weight substances by contacting with chemical liquids can be prevented.

The total layer number in the first embodiment of the multilayer tube is not particularly limited as long as the tube has at least two layers including the layer (a) and the layer (b). Further, the first embodiment of the multilayer tube may have one layer or two or more layers containing other thermoplastic resins other than the two layers of the layer (a) and the layer (b) for providing further functions or for obtaining economically advantageous multilayer tube. Although the layer number of the first embodiment of the multilayer tube is two or more layers, the layer number is preferably 8 or less, and more preferably from 2 to 7, considering from the mechanism of the production machine of the multilayer tube.

A second embodiment of the multilayer tube further includes the layer (c) in the first embodiment, and has three or more layers.

In the second embodiment of the multilayer tube, including the layer (a) is essential, and the multilayer tube having excellent mechanical properties, chemical resistance and flexibility can be obtained. Including the layer (b) is also essential, the multilayer tube has good barrier properties to chemical liquids, in particular, barrier properties to water vapor, a coolant (LLC), and a urea solution. Further, including the layer (c) is also essential, the resulting multilayer tube having excellent low temperature impact resistance, breakage pressure strength at high temperature, and long-term resistance to chemical liquids can be obtained. The thickness of the layer (a) in the multilayer tube occupies 60% or more and 95% or less of the total thickness of the tube, preferably 65% or more and 95% or less, and more preferably 70% or more and 85% or less of the total thickness of the tube. When the thickness of the layer (a) is within the ranges, various properties described above can be effectively exerted. The total thickness of the layer (b) and the layer (c) in the multilayer tube occupies more than 5% and less than 40% of the total thickness of the tube, preferably more than 10% and less than 35%, and more preferably more than 15% and less than 30% of the total thickness of the tube. When the total thickness of the layer (b) and the layer (c) is within the ranges, various properties described above can be effectively exerted.

In a preferred embodiment, the layer (c) is disposed on an inner side of the layer (b). Therefore, the layer (a), the layer (b) and the layer (c) are preferably arranged in the order from the outside to the inside of the multilayer tube. By arranging these layers in the order, the resulting multilayer tube can have further excellent resistance to permeation of chemical liquids and long-term resistance to chemical liquids.

In a further preferred embodiment, the layer (b) and the layer (c) are contiguously arranged. That is, in the multilayer tube, the layer (a) is arranged at an outermost layer, the layer (b) is arranged at an intermediate layer, and the layer (c) is arranged at an innermost layer. By arranging the layer (a) at the outermost layer, the multilayer tube having excellent breakage pressure strength at high temperature can be obtained. By arranging the layer (b) at the intermediate layer, the multilayer tube having excellent interlayer adhesion can be obtained. By arranging the layer (c) at the innermost layer, the elution of low molecular weight substances by contacting with chemical liquids can be prevented.

The total layer number in the second embodiment of the multilayer tube is not particularly limited as long as the tube has at least three layers including the layer (a), the layer (b) and the layer (c). Further, the second embodiment of the multilayer tube may have one layer or two or more layers containing other thermoplastic resins other than the three layers of the layer (a), the layer (b) and the layer (c) for providing further functions or for obtaining economically advantageous multilayer tube. Although the layer number of the second embodiment of the multilayer tube is three or more layers, the layer number is preferably 8 or less, and more preferably from 3 to 7, considering from the mechanism of the production machine of the multilayer tube.

Example of other thermoplastic resins in the first and the second embodiments of the multilayer tube include a polyamide-based resin, such as a homopolymer except for the polyamide (A1), the modified polyolefin (B) and the polyolefin (C), including polycaproamide (Polyamide 6), polyethylene adipamide (Polyamide 26), polytetramethylene succinamide (Polyamide 44), polytetramethylene glutamide (Polyamide 45), polytetramethylene adipamide (Polyamide 46), polytetramethylene suberamide (Polyamide 48), polytetramethylene azelamide (Polyamide 49), polytetramethylene sebacamide (Polyamide 410), polypentamethylene succinamide (Polyamide 54), polypentamethylene glutamide (Polyamide 55), polypentamethylene adipamide (Polyamide 56), polypentamethylene suberamide (Polyamide 58), polypentamethylene azelamide (Polyamide 59), polypentamethylene sebacamide (Polyamide 510), polyhexamethylene succinamide (Polyamide 64), polyhexamethylene glutamide (Polyamide 65), polyhexamethylene adipamide (Polyamide 66), polyhexamethylene suberamide (Polyamide 68), polyhexamethylene azelamide (Polyamide 69), polynonamethylene adipamide (Polyamide 96), polymetaxylylene succinamide (Polyamide MXD4), polymetaxylylene glutamide (Polyamide MXD5), polymetaxylylene adipamide (Polyamide MXD6), polymetaxylylene suberamide (Polyamide MXD8), polymetaxylylene azelamide (Polyamide MXD9), polymetaxylylene sebacamide (Polyamide MXD10), polymetaxylylene dodecamide (Polyamide MXD12), polymetaxylylene terephthalamide (Polyamide MXDT), polymetaxylylene isophthalamide (Polyamide MXDI), polymetaxylylene hexahydroterephthalamide (Polyamide MXDT(H)), polymetaxylylene naphthalamide (Polyamide MXDN), polyparaxylylene succinamide (Polyamide PXD4), polyparaxylylene glutamide (Polyamide PXD5), polyparaxylylene adipamide (Polyamide PXD6), polyparaxylylene suberamide (Polyamide PXD8), polyparaxylylene azelamide (Polyamide PXD9), polyparaxylylene sebacamide (Polyamide PXD10), polyparaxylylene dodecamide (Polyamide PXD12), polyparaxylylene terephthalamide (Polyamide PXDT), polyparaxylylene isophthalamide (Polyamide PXDI), polyparaxylylene hexahydroterephthalamide (Polyamide PXDT(H)), polyparaxylylene naphthalamide (Polyamide PXDN), polyparaphenylene terephthalamide (PPTA), polyparaphenylene isophthalamide (PPIA), polymetaphenylene terephthalamide (PMTA), polymetaphenylene isophthalamide (PMIA), poly(2, 6-naphthalenedimethylene succinamide) (Polyamide 2, 6-BAN4), poly(2, 6-naphthalenedimethylene glutamide) (Polyamide 2, 6-BAN5), poly(2, 6-naphthalenedimethylene adipamide) (Polyamide 2, 6-BAN6), poly(2, 6-naphthalenedimethylene suberamide) (Polyamide 2, 6-BAN8), poly(2, 6-naphthalenedimethylene azelamide) (Polyamide 2, 6-BAN9), poly(2, 6-naphthalenedimethylene sebacamide) (Polyamide 2, 6-BAN10), poly(2, 6-naphthalenedimethylene dodecamide) (Polyamide 2, 6-BAN12), poly(2, 6-naphthalenedimethylene terephthalamide) (Polyamide 2, 6-BANT), poly(2, 6-naphthalenedimethylene isophthalamide) (Polyamide 2, 6-BANI), poly(2, 6-naphthalenedimethylene hexahydroterephthalamide) (Polyamide 2, 6-BANT(H)), poly(2, 6-naphthalenedimethylene naphthalamide) (Polyamide 2, 6-BANN), poly(1, 3-cyclohexanedimethylene succinamide) (Polyamide 1, 3-BAC4), poly(1, 3-cyclohexanedimethylene glutamide) (Polyamide 1, 3-BAC5), poly(1, 3-cyclohexanedimethylene adipamide) (Polyamide 1, 3-BAC6), poly(1, 3-cyclohexanedimethylene suberamide (Polyamide 1, 3-BAC8), poly(1, 3-cyclohexanedimethylene azelamide) (Polyamide 1, 3-BAC9), poly(1, 3-cyclohexanedimethylene sebacamide) (Polyamide 1, 3-BAC10), poly(1, 3-cyclohexanedimethylene dodecamide) (Polyamide 1, 3-BAC12), poly(1, 3-cyclohexanedimethylene terephthalamide) (Polyamide 1, 3-BACT), poly(1, 3-cyclohexanedimethylene isophthalamide) (Polyamide 1, 3-BACI), poly(1, 3-cyclohexanedimethylene hexahydroterephthalamide) (Polyamide 1, 3-BACT(H)), poly(1, 3-cyclohexanedimethylene naphthalamide) (Polyamide 1, 3-BACN), poly(1, 4-cyclohexanedimethylene succinamide) (Polyamide 1, 4-BAC4), poly(1, 4-cyclohexanedimethylene glutamide) (Polyamide 1, 4-BAC5), poly(1, 4-cyclohexanedimethylene adipamide) (Polyamide 1, 4-BAC6), poly(1, 4-cyclohexanedimethylene suberamide) (Polyamide 1, 4-BAC8), poly(1, 4-cyclohexanedimethylene azelamide) (Polyamide 1, 4-BAC9), poly(1, 4-cyclohexanedimethylene sebacamide) (Polyamide 1, 4-BAC10), poly(1, 4-cyclohexanedimethylene dodecamide) (Polyamide 1, 4-BAC12), poly(1, 4-cyclohexanedimethylene terephthalamide) (Polyamide 1, 4-BACT), poly(1, 4-cyclohexanedimethylene isophthalamide) (Polyamide 1, 4-BACI), poly(1, 4-cyclohexanedimethylene hexahydroterephthalamide) (Polyamide 1, 4-BACT(H)), poly(1, 4-cyclohexanedimethylene naphthalamide) (Polyamide 1, 4-BACN), poly(4, 4'-methylenebiscyclohexylene succinamide) (Polyamide PACM4), poly(4, 4'-methylenebiscyclohexylene glutamide) (Polyamide PACM5), poly(4, 4'-methylenebiscyclohexylene adipamide) (Polyamide PACM6), poly(4, 4'-methylenebiscyclohexylene suberamide) (Polyamide PACM8), poly(4, 4'-methylenebiscyclohexylene azelamide) (Polyamide PACM9), poly(4, 4'-methylenebiscyclohexylene sebacamide) (Polyamide PACM10), poly(4, 4'-methylenebiscyclohexylene dodecamide) (Polyamide PACM12), poly(4, 4'-methylenebiscyclohexylene tetradecamide) (Polyamide PACM14), poly(4, 4'-methylenebiscyclohexylene hexadecamide) (Polyamide PACM16), poly(4, 4'-methylenebiscyclohexylene octadecamide) (Polyamide PACM18), poly(4, 4'-methylenebiscyclohexylene terephthalamide) (Polyamide PACMT), poly(4, 4'-methylenebiscyclohexylene isophthalamide) (Polyamide PACMI), poly(4, 4'-methylenebiscyclohexylene hexahydroterephthalamide) (Polyamide PACMT(H)), poly(4, 4'-methylenebiscyclohexylene naphthalamide) (Polyamide PACMN), poly(4, 4'-methylenebis(2-methyl-cyclohexylene)succinamide) (Polyamide MACM4), poly(4, 4'-methylenebis(2-methyl-cyclohexylene)glutamide) (Polyamide MACM5), poly(4, 4'-methylenebis(2-methyl-cyclohexylene)adipamide) (Polyamide MACM6), poly(4, 4'-methylenebis(2-methyl-cyclohexylene)suberamide) (Polyamide MACM8), poly(4, 4'-methylenebis(2-methyl-cyclohexylene)azelamide) (Polyamide MACM9), poly(4, 4'-methylenebis(2-methyl-cyclohexylene)sebacamide) (Polyamide MACM10), poly(4, 4'-methylenebis(2-methyl-cyclohexylene)dodecamide) (Polyamide MACM12), poly(4, 4'-methylenebis(2-methyl-cyclohexylene)tetradecamide) (Polyamide MACM14), poly(4, 4'-methylenebis(2-methyl-cyclohexylene)hexadecamide) (Polyamide MACM16), poly(4, 4'-methylenebis(2-methyl-cyclohexylene)octadecamide) (Polyamide MACM18), poly(4, 4'-methylenebis(2-methyl-cyclohexylene)terephthalamide) (Polyamide MACMT), poly(4, 4'-methylenebis(2-methyl-cyclohexylene)isophthalamide) (Polyamide MACMI), poly(4, 4'-methylenebis(2-methyl-cyclohexylene)hexahydroterephthalamide) (Polyamide MACMT(H)), poly(4, 4'-methylenebis(2-methyl-cyclohexylene)naphthalamide) (Polyamide MACMN), poly(4, 4'-propylenebiscyclohexylene succinamide) (Polyamide PACP4), poly(4, 4'-propylenebiscyclohexylene glutamide) (Polyamide PACP5), poly(4, 4'-propylenebiscyclohexylene adipamide) (Polyamide PACP6), poly(4, 4'-propylenebiscyclohexylene suberamide) (Polyamide PACP8), poly(4, 4'-propylenebiscyclohexylene azelamide) (Polyamide PACP9), poly(4, 4'-propylenebiscyclohexylene sebacamide) (Polyamide PACP10), poly(4, 4'-propylenebiscyclohexylene dodecamide) (Polyamide PACP12), poly(4, 4'-propylenebiscyclohexylene tetradecamide) (Polyamide PACP14), poly(4, 4'-propylenebiscyclohexylene hexadecamide) (Polyamide PACP16), poly(4, 4'-propylenebiscyclohexylene octadecamide) (Polyamide PACP18), poly(4, 4'-propylenebiscyclohexylene terephthalamide) (Polyamide PACPT), poly(4, 4'-propylenebiscyclohexylene isophthalamide) (Polyamide PACPI), poly(4, 4'-propylenebiscyclohexylene hexahydroterephthalamide) (Polyamide PACPT(H)), poly(4, 4'-propylenebiscyclohexylene naphthalamide) (Polyamide PACPN), polyisophorone succinamide (Polyamide IPD4), polyisophorone glutamide (Polyamide IPD5), polyisophorone adipamide (Polyamide IPD6), polyisophorone suberamide (Polyamide IPD8), polyisophorone azelamide (Polyamide IPD9), polyisophorone sebacamide (Polyamide IPD10), polyisophorone dodecamide (Polyamide IPD12), polyisophorone terephthalamide (Polyamide IPDT), polyisophorone isophthalamide (Polyamide IPDI), polyisophorone hexahydroterephthalamide (Polyamide IPDT(H)), polyisophorone naphthalamide (Polyamide IPDN), polytetramethylene terephthalamide (Polyamide 4T), polytetramethylene isophthalamide (Polyamide 4I), polytetramethylene hexahydroterephthalamide (Polyamide 4T(H)), polytetramethylene naphthalamide (Polyamide 4N), polypentamethylene terephthalamide (Polyamide 5T), polypentamethylene isophthalamide (Polyamide 5I), polypentamethylene hexahydroterephthalamide (Polyamide 5T(H)), polypentamethylene naphthalamide (Polyamide 5N), polyhexamethylene terephthalamide (Polyamide 6T), polyhexamethylene isophthalamide (Polyamide 6I), polyhexamethylene hexahydroterephthalamide (Polyamide 6T(H)), polyhexamethylene naphthalamide (Polyamide 6N), poly(2-methylpentamethylene terephthalamide) (Polyamide M5T), poly(2-methylpentamethylene isophthalamide) (Polyamide M5I), poly(2-methylpentamethylene hexahydroterephthalamide) (Polyamide M5T(H)), poly(2-methylpentamethylene naphthalamide (Polyamide M5N), polynonamethylene terephthalamide (Polyamide 9T), polynonamethylene isophthalamide (Polyamide 9I), polynonamethylene hexahydroterephthalamide (Polyamide 9T(H)), polynonamethylene naphthalamide (Polyamide 9N), poly(2-methyloctamethylene terephthalamide) (Polyamide M8T), poly(2-methyloctamethylene isophthalamide) (Polyamide M8I), poly(2-methyloctamethylene hexahydroterephthalamide) (Polyamide M8T(H)), poly(2-methyloctamethylene naphthalamide) (Polyamide M8N), polytrimethylhexamethylene terephthalamide (Polyamide TMHT), polytrimethylhexamethylene isophthalamide (Polyamide TMHI), polytrimethylhexamethylene hexahydroterephthalamide (Polyamide TMHT(H)), polytrimethylhexamethylene naphthalamide (Polyamide TMHN), polydecamethylene terephthalamide (Polyamide 10T), polydecamethylene isophthalamide (Polyamide 10I), polydecamethylene hexahydroterephthalamide (Polyamide 10T(H)), polydecamethylene naphthalamide (Polyamide 10N), polyundecamethylene terephthalamide (Polyamide 11T), polyundecamethylene isophthalamide (Polyamide 11I), polyundecamethylene hexahydroterephthalamide (Polyamide 11T(H)), polyundecamethylene naphthalamide (Polyamide 11N), polydodecamethylene terephthalamide (Polyamide 12T), polydodecamethylene isophthalamide (Polyamide 12I), polydodecamethylene hexahydroterephthalamide (Polyamide 12T(H)), and polydodecamethylene naphthalamide (Polyamide 12N), and/or a raw material monomer of these polyamides, and/or a copolymer using two or more raw material monomers of the polyamide (A).

Further examples include a fluorine-containing polymer such as a polyfluorinated vinylidene (PVDF), a polyfluorinated vinyl (PVF), a polytetrafluoroethylene (PTFE), a polychlorotrifluoroethylene (PCTFE), a tetrafluoroethylene/perfluoro(alkylvinyl ether) copolymer (PFA), a tetrafluoroethylene/hexafluoropropylene copolymer (FEP), a tetrafluoroethylene/perfluoro(alkylvinyl ether)/hexafluoropropylene copolymer, an ethylene/tetrafluoroethylene copolymer (ETFE), an ethylene/tetrafluoroethylene/hexafluoropropylene copolymer (EFEP), a fluorinated vinylidene/tetrafluoroethylene copolymer, a fluorinated vinylidene/hexafluoropropylene copolymer, a fluorinated vinylidene/perfluoro(alkylvinyl ether) copolymer, a tetrafluoroethylene/hexafluoropropylene/fluorinated vinylidene copolymer (THV), a fluorinated vinylidene/perfluoro(alkylvinyl ether)/tetrafluoroethylene copolymer, a tetrafluoroethylene/hexafluoropropylene/fluorinated vinylidene/perfluoro(alkylvinyl ether) copolymer, an ethylene/chlorotrifluoroethylene copolymer (ECTFE), a chlorotrifluoroethylene/tetrafluoroethylene copolymer, a fluorinated vinylidene/chlorotrifluoroethylene copolymer, a chlorotrifluoroethylene/perfluoro(alkylvinyl ether) copolymer, a chlorotrifluoroethylene/hexafluoropropylene copolymer, a chlorotrifluoroethylene/tetrafluoroethylene/hexafluoropropylene copolymer, a chlorotrifluoroethylene/tetrafluoroethylene/fluorinated vinylidene copolymer, a chlorotrifluoroethylene/perfluoro(alkylvinyl ether)/tetrafluoroethylene copolymer (CPT), a chlorotrifluoroethylene/perfluoro(alkylvinyl ether)/hexafluoropropylene copolymer, a chlorotrifluoroethylene/tetrafluoroethylene/hexafluoropropylene/perfluoro(alkylvinyl ether) copolymer, a chlorotrifluoroethylene/tetrafluoroethylene/fluorinated vinylidene/perfluoro(alkylvinyl ether) copolymer, a chlorotrifluoroethylene/tetrafluoroethylene/fluorinated vinylidene/hexafluoropropylene copolymer, a chlorotrifluoroethylene/tetrafluoroethylene/fluorinated vinylidene/perfluoro(alkylvinyl ether)/hexafluoropropylene copolymer and/or a fluorine-containing polymer containing a functional group having a reactivity to an amino group.

Further examples include a polyester-based resin such as polybutylene terephthalate (PBT), polyethylene terephthalate (PET), polyethylene isophthalate (PEI), a poly(ethylene terephthalate/ethylene isophthalate) copolymer (PET/PEI), a polytrimethylene terephthalate (PTT), a polycyclohexane dimethylene terephthalate (PCT), polyethylene naphthalate (PEN), polybutylene naphthalate (PBN), polyallylate (PAR), a liquid crystal polyester (LCP), polylactic acid (PLA), and polyglycolic acid (PGA); a polyether-based resin such as polyacetal (POM) and polyphenylene ether (PPO); a polysulfone-based resin such as polysulfone (PSU), polyethersulfone (PESU), and polyphenylsulfone (PPSU); a polythioether-based resin such as polyphenylene sulfide (PPS) and polythioether sulfone (PTES); a polyketone-based resin such as an aliphatic polyketone, a polyether ketone (PEK), a polyether ether ketone (PEEK), a polyether ketone (PEKK), a polyether ether ketone (PEEEK), a polyether ether ketone (PEEKK), a polyether ketone (PEKKK), and a polyether ketone ether ketone (PEKEKK); a polynitrile-based resin such as polyacrylonitrile (PAN), polymethacrylonitrile, an acrylonitrile/styrene copolymer (AS), a methacrylonitrile/styrene copolymer, an acrylonitrile/butadiene/styrene copolymer (ABS), and an acrylonitrile/butadiene copolymer (NBR); a polymethacrylate-based resin such as polymethyl methacrylate (PMMA), and polyethyl methacrylate (PEMA); a polyvinyl ester-based resin such as polyvinyl acetate (PVAc); polyvinyl chloride-based resin such as polyvinylidene chloride (PVDC), polyvinyl chloride (PVC), a vinyl chloride/vinylidene chloride copolymer, and a vinylidene chloride/methyl acrylate copolymer; a cellulose-based resin such as cellulose acetate and cellulose butylate; a polycarbonate-based resin such as polycarbonate (PC); a polyimide-based resin such as a thermoplastic polyimide (TPI), a polyether imide, a poly ester imide, a polyamide imide (PAI), and a polyester amide imide; a thermoplastic polyurethane-based resin; an ethylene/vinyl acetate copolymer saponification product (EVOH), a polyamide elastomer, a polyurethane elastomer, and a polyester elastomer.

Further, a substrate other than the thermoplastic resin, for example, a paper, a metal-based material, a non-oriented-, uniaxial oriented-, or biaxial oriented-plastic film or sheet, a woven fabric, a non-woven fabric, a metallic cotton, and a wood can be laminated. Examples of the metal-based material include a metal and/or a metal compound thereof such as a metal such as aluminum, iron, copper, nickel, gold, silver, titanium, molybdenum, magnesium, manganese, lead, tin, chromium, beryllium, tungsten, and cobalt, an alloy steel containing these two or more thereof such as stainless steel, and an alloy such as an aluminum alloy, a copper alloy including brass and bronze, and a nickel alloy.

Examples of methods used to produce the multilayer tube include a method of melt-extruding using a number of extruding machines corresponding to the number of layers or number of materials followed by simultaneously laminating inside or outside a die (co-extrusion method), and a method of preliminarily producing a single-layer tube or multilayer tube produced according to the aforementioned method, and then sequentially integrating the resin and laminating on the outside using an adhesive as necessary (coating method). In the multilayer tube of the present invention, the multilayer tube is preferably produced by a coextrusion method of coextruding various materials in melted form and heat fusing (melt-fusing) these materials to produce a tube having multilayer structure in one step.

In addition, in the case the resulting multilayer tube has a complex shape or is used in the form of a molded product by subjecting to heat bending after processing, the target molded product can be obtained by carrying out heat treatment for 0.01 hours to 10 hours after forming the aforementioned multilayer tube at a temperature lower than the lowest melting point of the melting points of the resins that compose the tube in order to remove residual strain of the molded product.

The multilayer tube may have a wavy region. A wavy region refers to a region formed into a waveform shape, bellowed shape, accordion shape or corrugated shape. The wavy region may be provided over the entire length of the multilayer tube or provided only partially in a suitable intermediate region. The wavy region can be easily formed by first forming a straight tube and then subjecting the tube to molding to form into a prescribed wavy shape. The presence of this wavy region enables the multilayer tube to absorb impacts and facilitates mounting. Moreover, the wavy region can also be fitted with a necessary component such as a connector or can be formed into an L-shape or U-shape by bending processing.

A solid or sponge-like protective member (protector) can be arranged on all or a portion of the outer periphery of the multilayer tube molded in this manner in consideration of damage caused by flying stones, wear with other components and fire resistance, and examples of materials composing the protective member include natural rubber (NR), butadiene rubber (BR), isoprene rubber (IR), butyl rubber (IIR), chloroprene rubber (CR), carboxylated butadiene rubber (XBR), carboxylated chloroprene rubber (XCR), epichlorhydrin rubber (ECO), acrylonitrile butadiene rubber (NBR), hydrogenated acrylonitrile butadiene rubber (HNBR), carboxylated acrylonitrile butadiene rubber (XNBR), mixtures of NBR and polyvinyl chloride, acrylonitrile isoprene rubber (NIR), chlorinated polyethylene rubber (CM), chlorosulfonated polyethylene rubber (CSM), ethylene propylene rubber (EPR), ethylene propylene diene rubber (EPDM), ethylene vinyl acetate rubber (EVM), mixed rubber of NBR and EPDM, acrylic rubber (ACM), ethylene acrylic rubber (AEM), acrylate butadiene rubber (ABR), styrene butadiene rubber (SBR), carboxylated styrene butadiene rubber (XSBR), styrene isoprene rubber (SIR), styrene isoprene butadiene rubber (SIBR), urethane rubber, silicone rubber (MQ, VMQ), fluororubber (FKM, FFKM), fluorosilicone rubber (FVMQ) and vinyl chloride-based, olefin-based, ester-based, urethane-based and amide-based thermoplastic elastomers. The protective member may be in the form of a sponge-like porous body produced by a known technique. The use of the protective member in the form of a porous body enables the formation of a protective member that is lightweight and demonstrates superior thermal insulating properties. In addition, material costs can also be reduced. Alternatively, the strength of the protective member may be improved by adding glass fiber and the like. There are no particular limitations on the shape of the protective member, and normally is a tubular member or is a block-like member having an indentation into which a tubular member or multilayer tube is inserted. In the case of a tubular member, the multilayer tube can be subsequently inserted into a preliminarily fabricated tubular member, or the tubular member can be extrusion-coated on the multilayer tube followed by adhering the two components to produce the protective member. In order to adhere the two components, by coating an adhesive on the inner surface of the protective member or on the aforementioned indented surface as necessary, inserting or fitting the multilayer tube therein and adhering the two components, a structure is formed in which the multilayer tube and protective member are integrated into a single unit. In addition, the protective member can also be reinforced with metal and the like.

Although the outer diameter of the multilayer tube is designed so that the thickness is not to increase the permeability of chemical liquids and to maintain the breakage pressure of the normal tube, considering of the flow rate of the circulating chemical liquids and/or a gas (for example, an engine coolant) and so that the flexibility can be maintained to the extent of good workability for assembling the tube and good vibration resistance during use, the diameter is not limited to them. Outer diameter is preferably 4 mm or more and 300 mm or less, inner diameter is preferably 3 mm or more and 250 mm or less, and wall thickness is preferably 0.5 mm or more and 25 mm or less.

The multilayer tube of the present embodiment can be used in various types of applications, including mechanical components such as automobile parts, internal combustion engine applications or power tool housings, as well as industrial materials, building materials, electrical and electronic components, health care applications, foods, home and office supplies, construction material components and furniture parts.

Further, the multilayer tube of the present invention is suitably used for a tube for transporting chemical liquids due to its excellent resistance to permeation of chemical liquids. Examples of the chemical liquid include aromatic hydrocarbon solvents such as benzene, toluene, xylene, and alkylbenzenes; alcohols such as methanol, ethanol, propanol, butanol, pentanol, ethylene glycol, propylene glycol, diethylene glycol, phenol, cresol, polyethylene glycol, polypropylene glycol; phenol solvents; ether solvents such as dimethyl ether, dipropyl ether, methyl-t-butyl ether, ethyl-t-butyl ether, dioxane, tetrahydrofuran, polyol esters, polyvinyl ethers and the like; HFC-23 (trifluoromethane), HFC-32 (difluoromethane), HFC-41 (fluoromethane), HFC-123 (2,2-dichloro-1,1,1-trifluoroethane), HFC-125 (1,1,1,2,2-pentafluoroethane), HFC-134 (1,1,2,2-tetrafluoroethane), HFC-134a (1,1,1,2-tetrafluoroethane), HFC-143 (1,1,2-trifluoroethane), HFC-143a (1,1,1-trifluoroethane), HFC-152 (1,2-difluoroethane), HFC-152a (1,1-difluoroethane), HFC-161 (fluoroethane), HFC-227ea (1,1,1,2,3,3,3-heptafluoropropane), HFC-227ca (1,1,2,2,3,3,3-heptafluoropropane), HFC-236fa (1,1,1,3,3,3-hexafluoropropane), HFC-236ea (1,1,1,2,3,3-hexafluoropropane), HFC-236cb(1,1,1,2,2,3-hexafluoropropane), HFC-236ca (1,1,2,2,3,3-hexafluoropropane), HFC-245ca (1,1,2,2,) 3-pentafluoropropane), HFC-245ea (1,1,2,3,3-pentafluoropropane), HFC-245eb (1,1,1,2,3-pentafluoropropane), HFC-245fa(1,1,1,3,3-pentafluoropropane), HFC-245cb (1,1,1,2,2-pentafluoropropane), HFC-254eb (1,1,1,2-tetrafluoropropane), HFC-254cb (1,1,2,2-tetrafluoropropane), HFC-254ca (1,2,2,3-tetrafluoropropane), HFC-263fb (1,1,1-trifluoropropane), HFC-263ca (1,2,2-trifluoropropane), HFC-272fb (1,1-difluoropropane), HFC-272ea (1,2-difluoropropane), HFC-272fa (1,3-difluoropropane), HFC-272ca (2,2-difluoropropane), HFC-281fa (1-fluoropropane), HFC-281ea (2-fluoropropane), HFC-329p (1,1,1,2,2,3,3,4,4-nonafluorobutane), HFC-329mmz (1,1,1, 3,3,3-hexafluoro-2-(trifluoro)propane), HFC-338mf (1,1,1,3,3,4,4,4-octafluorobutane), HFC-338mcc (1,1,1,2,2,3,4,4-octafluorobutane), HFC-338pcc (1,1,2,2,3,3,4,4-octafluorobutane), HFC-347s (1,1,1,2,2,3,3-heptafluorobutane), HFC-365mfc (1,1,1,3,3-pentafluorobutane), HFC-4310mee (1,1,1,2,3,4,4,5,5,5-decafluoropentane), HFC-1123 (trifluoroethylene), HFC-1132a (1,2-difluoroethylene), FC-1216 (hexafluoro-1-propene), HFC-1223. (3,3,3-trifluoro-1-propene), HFC-1225zc (1, 1,3,3,3-pentafluoro-1-propene), HFC-1225ye (1,2,3,3,3-pentafluoro-1-propene), HFC-1225yc (1,1,2,3,3- pentafluoro-1-propene), HFC-1232xf (3,3-difluoro-1-propene), HFC-1234ye (1,2,3,3-tetrafluoro-1-propene), HFC-1234ze (1,3,3,3-tetrafluoro-1-propene), HFC-1234yf (2,3,3,3-tetrafluoro-1-propene), HFC-1234yc (1,1,2,3-tetrafluoro-1-propene), HFC-1234zc (1,1,3,3-tetrafluoro-1-propene), HFC-1243yf (2,3,3-trifluoro-1-propene), HFC-1243zc (1,1,3-trifluoro-1-propene), HFC-1243ye (1,2,3-trifluoro-1-propene), HFC-1243ze (1,3,3-trifluoro-1-propene), HFC-1243zf (3,3,3-trifluoro-1-propene), HFC-1243yc (1,1,2-trifluoro-1-propene), HFC-1261yf (2-fluoropropene), FC-1318my(1,1,1,2,3,4,4,4-octafluoro-2-butene), FC-1318cy (1, 1,2,3,3,4,4,4-octafluoro-1-butene), HFC-1327my (1,1,1,2,4,4,4-heptafluoro-2-butene), HFC-1327ye (1,2,3,3,4,4,4-heptafluoro-1-butene), HFC-1327py (1,1,1,2,3,4,4-heptafluoro-2-butene), HFC-1327et (1,3,3,3-tetrafluoro-2-(trifluoromethyl)-1-propene), HFC-1327cz (1,1,3,3,4,4,4-heptafluoro-1-butene), HFC-1327cye (1,1,2,3,4,4,4)-heptafluoro-1-butene), HFC-1327cyc (1,1,2,3,3,4,4-heptafluoro-1-butene), HFC-1336yf (2,3,3,4,4,4)-hexafluoro-1-butene), HFC-1336ze (1,3,3,4,4,4-hexafluoro-1-butene), HFC-1336eye (1,2,3,4,4,4-hexafluoro-1-butene), HFC-1336eyc (1,2,3,3,4,4-hexafluoro-1-butene), HFC-1336pyy (1,1,2,3,4,4-hexafluoro-2-butene), HFC-1336pz (1,1,1,2,4,4-hexafluoro-2-butene), HFC-1336mzy (1,1,1,3,4,4-hexafluoro-2-butene), HFC-1336mzz (1,1,1,4,4,4-hexafluoro-2-butene), HFC-1336qc (1,1,2,3,3,4-hexafluoro-1-butene), HFC-1336pe (1,1,2,3,4,4-hexafluoro-1-butene), HFC-1336 ft (3,3,3-trifluoro-2-(trifluoromethyl)-1-propene), HFC-1345qz (1,1,1,2,4-pentafluoro-2-butene), HFC-1345mzy (1,1,1,3,4-pentafluoro-2-butene), HFC-1345fz (3,3,4,4,4-pentafluoro-1-butene), HFC-1345mzz (1,1,1,4,4-pentafluoro-2-butene), HFC-1345sy (1,1,1,2,3-pentafluoro-2-butene), HFC-1345fyc (2, 3,3,4,4-pentafluoro-1-butene), HFC-1345pyz (1,1,2,4,4-pentafluoro-2-butene), HFC-1345cyc (1,1,2,3,3-pentafluoro-1-butene), HFC-1345pyy (1,1,2,3,4-pentafluoro-2-butene), HFC-1345eyc (1,2,3,3,4-pentafluoro-1-butene), HFC-1345ctm (1,1,3,3,3-pentafluoro-2-methyl-1-propene), HFC-1345ftp (2-(difluoromethyl)-3,3,3-trifluoro-1-propene), HFC-1345fye (2,3,4,4,4-pentafluoro-1-butene), HFC-1345eyf (1,2,4,4,4-pentafluoro-1-butene), HFC-1345eze (1,3,4,4,4-pentafluoro-1-butene), HFC-1345ezc (1,3,4,4,4-pentafluoro-1-butene), HFC-1345eye (1,2,3,4,4-pentafluoro-1-butene), HFC-1354fzc (3,3,4,4-tetrafluoro-1-butene), HFC-1354ctp (1,1,3,3-tetrafluoro-2)-Methyl-1-propene), HFC-1354etm (1,3,3,3-tetrafluoro-2-methyl-1-propene), HFC-1354tfp (2-(difluoromethyl)-3,3-difluoro-1-propene), HFC-1354my (1,1,1,2-tetrafluoro-2-butene), HFC-1354mzy (1,1,1,3-tetrafluoro-2-butene), FC-1410myy (1,1,1,2,3,4,5,5,5-decafluoro-2-pentene), FC-1410cy (1,1,2,3,3,4,4,5,5,5-decafluoro-1-pentene) HFC-1429mzt (1,1,1,4,4,4-hexafluoro-2-(trifluoromethyl)-2-butene), HFC-1429myz (1,1,1,2,4,4,5,5,5-nonafluoro-2-pentene), HFC-1429mzy (1,1,1,3,4,4,5,5,5-nonafluoro-2-pentene), HFC-1429eyc (1,2,3,3,4,4,5,5,5-nonafluoro-1-pentene), HFC-1429czc (1,1,3,3,4,4,5,5,5-nonafluoro-1-pentene), HFC-1429cycc (1,1,2,3,4,4,5,5,5-nonafluoro-1-pentene), HFC-1429pyy(1,1,2,3,4,5,5,5-nonafluoro-2-pentene), HFC-1429myc (1,1,1,2,3,4,5,5,5-nonafluoro-2-pentene)), HFC-1429myye (1,1,1,2,3,4,5,5,5-nonafluoro-2-pentene), HFC-1429eyym (1,2,3,4,4,4-hexafluoro-3-(trifluoromethyl)-1-butene), HFC-1429cyzm(1,1,2,4,4,4-hexafluoro-3-(trifluoromethyl)-1-butene), HFC-1429mzt (1,1,1,4,4,4-hexafluoro-2-(trifluoromethyl)-2-butene), HFC-1429czym (1,1,3,4,4,4-hexafluoro-3-(trifluoromethyl)-1-butene), HFC-1438fy (2,3,3,4,4,5,5-octafluoro-1-pentene), HFC-1438eycc (1,2,3,3,4,4,5,5-octafluoro-1-pentene), HFC-1438ftmc (3,3,4,4,4-pentafluoro-2-(trifluoromethyl)-1-butene), HFC-1438czzm(1,1,4,4,4-pentafluoro-3-(trifluoromethyl)-1-butene), HFC-1438ezym (1,3,4,4,4-pentafluoro-3-(trifluoromethyl)-1-butene), HFC-1438ctmf (1,1,4,4,4-pentafluoro-2-(trifluoromethyl)-1-butene), HFC-1447fzy (3,4,4,4-tetrafluoro-3-(trifluoromethyl)-1-butene), HFC-1447fz (3,3,4,4,5,5,5-pentafluoro-1-pentene), HFC-1447fycc (2,3,3,4,4,5,5-heptafluoro-1-pentene), HFC-1447cz (1,1,3,3,5,5,5-heptafluoro-1-pentene), HFC-1447mytm (1,1,1,2,4,4,4-heptafluoro-3-methyl-2-butene), HFC-1447fyz (2,4,4,4-tetrafluoro-3-(trifluoromethyl)-1-butene), HFC-1447ezz (1,4,4,4-tetrafluoro-3-(trifluoromethyl)-1-butene), HFC-1447qzt (1,4,4,4-tetrafluoro-2-(trifluoromethyl)-2-butene), HFC-1447syt (2,4,4,4-tetrafluoro-2-(trifluoromethyl)-2-butene), HFC-1456szt (3-(trifluoromethyl)-4,4,4-trifluoro-2-butene), HFC-1456szy (3,4,4,5,5,5-hexafluoro-2-pentene), HFC-1456mstz (1,1,1,4,4,4-hexafluoro-2-methyl-2-butene), HFC-1456fzce (3,3,4,5,5,5-hexafluoro-1-pentene), HFC-1456ftmf (4,4,4-trifluoro-2-(trifluoromethyl)-1)-butene), FC-151-12c (1,1,2,3,3,4,4,5,5,6,6,6-dodeca-1-hexene, perfluoro-1-hexene), FC-151-12mcy (1,1,1,2,2,3,4,5,5,6,6,6-dodeca-3-hexene, perfluoro-3-hexene), FC-151-12mmtt (1,1,1,4,4,4-hexafluoro-2,3-bis(trifluoromethyl)-2-butene), FC-151-12mzz (1,1,1,2,3,4,5,5,5)-nonafluoro-4-(trifluoromethyl)-2-pentene), HFC-152-11mmtz (1,1,1,4,4,5,5,5-octafluoro-2-(trifluoromethyl)-2-pentene), HFC-152-11mmyyz (1,1,1,3,4,5,5,5-octafluoro-4-(trifluoromethyl)-2-pentene), HFC-152-11mmyyz (1,1,1,3,4,5,5,5-octafluoro-4-(trifluoromethyl)-2-pentene), HFC-1549fz (PFBE) (3,3,4,4,5,5,6,6,6-nonafluoro-1-hexene, perfluorobutyl), HFC-1549fztmm (4,4,4-trifluoro-3,3-bis(trifluoromethyl)-1-butene), HFC-1549mmtts (1,1,1,4,4,4-hexafluoro-3-methyl-2-(trifluoromethyl)-2-butene), HFC-1549fycz (2,3,3,5,5,5-hexafluoro-4-(trifluoromethyl)-1-pentene), HFC-1549myts (1,1,1,2,4,4,5,5,5-nonafluoro-3-methyl-2-pentene), HFC-1549mzzzz (1,1,1,5,5,5-hexafluoro-4-(trifluoromethyl)-2-pentene), HFC-1558szy (3,4,4,5,5,6,6,6-octafluoro-2-hexene), HFC-1558fzccc (3,3,4,4,5,5,6,6-octafluoro-2-hexene), HFC-1558mmtzc (1,1,1,4,4-pentafluoro-2-(trifluoromethyl)-2-pentene), HFC-1558ftmf (4,4,5,5,5-pentafluoro-2-(trifluoromethyl)-1-pentene), HFC-1567fts (3,3,4,4,5,5,5-heptafluoro-2-methyl-1-pentene), HFC-1567szz (4,4,5,5,6,6,6-heptafluoro-2-hexene), HFC-1567fzfc (4,4,5,5,6,6,6-heptafluoro-1-hexene), HFC-1567sfyy (1,1,1,2,2,3,4-heptafluoro-3-hexene), HFC-1567fzfy (4,5,5,5-tetrafluoro-4-(trifluoromethyl)-1-pentene), HFC-1567myzzm (1,1,1,2,5,5,5-heptafluoro-4-methyl-2-pentene), HFC-1567mmtyf (1,1,1,3-tetrafluoro-2-(trifluoromethyl)-2-pentene), FC-161-14myy (1,1,1,2,3,4,4,5,5,6,6,7,7,7-tetradecafluoro-2-heptene), FC-161-14mcyy (1,1,1,2,2,3,4,5,6,6,7,7,7-tetradecafluoro-2-heptene), HFC-162-13mzy (1,1,1,3,4,4,5,5,6,6,7,7,7-tridecafluoro-2-heptene), HFC162-13myz (1,1,1,2,4,4,5,5,6,6,7,7,7-tridecafluoro-2-heptene), HFC-162-13mczy (1,1,1,2,2,4,5,5,6,6,7,7,7-tridecafluoro-3-heptene), HFC-162-13mcyz (1,1,1,2,2,3,5,5,6,6,7,7,7-tridecafluoro-3-heptene), CFC-11 (fluorotrichloromethane), CFC-12 (dichlorodifluoromethane), CFC-114 (1,1,2,2-tetrafluoro-1,2-dichloroethane), CFC-114a (1,1,1,2-tetrafluoro-2,2-dichloroethane), CFC-115 (1,1,1,2,2-pentafluoro-2-dichloroethane), HCFC-21 (dichlorofluoromethane), HCFC-22 (chlorodifluoromethane), HCFC-122 (1,1,2-trichloro-2,2-difluoroethane), HCFC-123 (1,1,1-trifluoro-2,2-dichloroethane), HCFC-124 (1,1,1,2-tetrafluoro-2-chloroethane), HCFC-124a (1,1,2,2-tetrafluoro-2-chloroethane), HCFC-132 (dichlorodifluoroethane), HCFC-133a (1,1,1-trifluoro-2-chloroethane), HCFC-141b (1,1-dichloro-1-fluoroethane), HCFC-142 (1,1-difluoro-2-chloroethane), HCFC-142b (1,1-difluoro-1-chloroethane), HCFC-225ca (3,3-dichloro-1,1,1,2,2-pentafluoropropane), HCFC-225cb (1,3-dichloro-1,1,2,2,3-pentafluoropropane), HCFC-240db (1,1,1,2,3-pentachloropropane), HCFC-243db (1,1,1-trifluoro-2,3-dichloropropane), HCFC-243ab (1,1,1-trifluoro-2,2-dichloropropane), HCFC-244eb (1,1,1,2-tetrafluoro-3-chloropropane)), HCFC-244bb (1,1,1,2-tetrafluoro-2-chloropropane), HCFC-244db (1,1,1,3-tetrafluoro-2-chloropropane), HCFC-1111 (1,1, 2-trichloro-2-fluoroethylene), HCFC-1113 (1,1,2-trifluoro-2-chloroethylene), HCFC-1223xd (3,3,3-trifluoro-1,2-dichloropropene), HCFC-1224xe (1,3,3,3-tetrafluoro) 2-chloropropene), HCFC-1232xf (3,3-difluoro-1,3-dichloropropene), HCFC-1233xf (3,3,3-trifluoro-2-chloropropene), HCFC-1233zd (3. 3,3-trifluoro-1-chloropropene), and haloolefins such as mixtures thereof; ketone solvents such as acetone, methyl ethyl ketone, diethyl ketone, acetophenone; mineral oils, silicone oils, natural paraffins, naphthenes, synthetic paraffins, polyalphaolefins, gasoline, kerosene, diesel gasoline, rapeseed oil methyl ester, soybean oil methyl ester, palm oil methyl ester, coconut oil methyl ester, gas liquefied oil (Gas To Liquid: GTL), Coal liquefied oil (Coal To Liquid: CTL), biomass liquefied oil (Biomass To Liquid: BTL), alcohol-containing gasoline, ethyl-t-butyl ether blend oxygen-containing gasoline, amine-containing gasoline, sour gasoline, compressed natural gas (CNG), liquefied petroleum gas (LPG), liquefied hydrocarbon gas (LHG), liquefied natural gas (LNG), Dimethyl ether (DME) for fuel, castor oil-based brake fluid, glycol ether-based brake fluid, borate ester-based brake fluid, extremely cold area brake fluid, silicone oil-based brake fluid, mineral oil-based brake fluid, power steering oil, hydrogen sulfide-containing oil, window washer fluid, engine cooling fluid, urea solution, pharmaceutical agent, ink, paint and the like.

The multilayer tube is suitably used for the tube for transporting chemical liquids. Specifically, the multilayer tube is preferably used for fuel tubes such as a feed tube, return tube, evaporation tube, fuel filler tube, ORVR tube, reserve tube or vent tube, oil tube, oil drilling tube, brake tube, window washer fluid tube, engine coolant tube (LLC) tube, reserve tank tube, urea solution transport tube, cooling water or coolant cooler tube, air-conditioner coolant tube, heater tube, road heating tube, floor heating tube, infrastructure supply tube, fire extinguisher or extinguishing equipment tube, medical cooling equipment tube, ink, paint spraying tube and other liquid chemical tubes. The multilayer tube is more preferably used for a coolant (LLC) cooler tube, a urea solution transporting tube, a tube for battery cooling and heating, or a tube for air conditioner.

EXAMPLES

Hereinafter, although the present invention is specifically described by illustrating Examples and Comparative Examples as follows, the invention is not limited to these Examples and Comparative Examples. Firstly, analyzing methods and measuring methods of properties in Examples and Comparative Examples, and materials used in Examples and Comparative Examples are described.

1. Properties of polyamides were measured by the following methods.

[Relative Viscosity]

Relative viscosity was measured in compliance with JIS K-6920 under conditions of 96% sulfuric acid, a polyamide concentration of 1% and temperature of 25° C.

[Bending Elastic Modulus]

The bending elastic modulus was measured in compliance with ISO 178.

[Terminal Amino Group Concentration]

A prescribed amount of polyamide sample was placed in an Erlenmeyer flask equipped with a stopcock, and after adding 40 mL of a preliminarily prepared phenol/methanol solvent (volume ratio: 9/1), the sample was dissolved by stirring with a magnetic stirrer and the resulting solution was titrated with 0.05 N hydrochloric acid using thymol blue for the indicator to determine the terminal amino group concentration.

[Terminal Carboxyl Group Concentration]

A prescribed amount of polyamide sample was placed in a three-mouth pear-shaped flask, and after adding 40 mL of benzyl alcohol, the flask was immersed in an oil bath set to 180° C. in the presence of flowing nitrogen. After dissolving by stirring with a stirring motor attached to the upper portion of the flask, the solution was titrated with 0.05 N sodium hydroxide solution using phenolphthalein for the indicator to determine the terminal carboxyl group concentration.

2. Properties of polyolefins were measured by the following methods.

[Melting Point]

The melting point was measured in compliance with ISO 11357-3.

[MFR]

MFR was measured in compliance with ISO 1133 under condition of 230° C. and 2,160 g.

[Density]

The density was measured in compliance with ISO 1183-3.

3. Each properties of multilayer tubes were measured by the following methods.

[Low Temperature Impact Resistance]

Impact test was performed at −40° C. by the method described in SAE J 2260 7.5.

[Breakage Pressure Strength at High Temperature]

Breakage pressure strength test was performed at 115° C. by the method described in SAE J 2260 7.2.

[Bending Stiffness (Flexibility)]

A tube cut to a length of 280 mm was treated in a hot air circulation oven at 110° C. for 72 hours. After that, a defined tester was used by the method described in SAE J 844 9.8 to measure a load when the tip of the test sample was moved to 50 mm at 23° C. When the measured load was 30 N or less, the test sample was determined to have excellent flexibility.

[Weight Loss (Dimensional Stability)]

A tube cut to a length of 0.3 m was treated in a hot air circulation oven at 100° C. for 72 hours. After that, the weight change was evaluated.

[Elution Resistance of Low Molecular Weight Substances (Plasticizer)]

A tube was cut to a length of 0.5 m, and the one end of the tube was sealed. An LLC being a mixture of 50% water and 50% ethylene glycol was introduced in the tube, and the other end of the tube was also sealed. After that, the test tube was entered in an oven at 135° C., and treated for 96 hours. After that, the solution in the tube was removed, and the plasticizer in the solution was analyzed quantitatively by a gas chromatography to measure the content of the plasticizer eluted in the LLC. The eluted amount of the plasticizer (g/m$^2$) was calculated by dividing the content of the plasticizer eluted in the LLC by the inner surface area of the tube. When the eluted amount is 2.0 g/m$^2$ or less, the test sample was determined to have excellent elution resistance.

[Whether Sulfur Atom was Detected]

Elemental analysis was performed for the solution in the tube obtained in the above-described "Elution Resistance of Low Molecular Weight Substances (Plasticizer)" test to confirm whether a sulfur atom was detected.

4. Materials used in Examples and Comparative Examples (1) Aliphatic Polyamide (A1)

[Production of Polyamide 12 (A1-1)]

In a pressure-resistant reaction vessel having an internal volume of 70 liters and equipped with a stirrer, 19.73 kg(100 mol) of dodecane lactam, 45.0 g(0.264 mol) of 5-amino-1,3,3-trimethylcyclohexanemethylamine and 0.5 L of distilled water, were charged. After replacing the inside of a polymerization tank with nitrogen, the mixture was heated to 180° C. and stirred so that the inside of the reaction system became a uniform state at this temperature. Then, the temperature in the polymerization tank was raised to 270° C., and polymerization was carried out for 2 hours under stirring while adjusting the pressure in the tank to 3.5 MPa. Thereafter, the pressure was released to normal pressure over about 2 hours, then, the pressure was reduced to 53 kPa and polymerization was carried out under reduce pressure for 5 hours. Then, nitrogen was introduced into the autoclave, and after the pressure was reduced to normal pressure, the product was drawn out from the nozzle at the lower portion of the reaction vessel and cut to obtain pellets. The pellets were dried under reduced pressure to obtain a Polyamide 12 having a relative viscosity of 2.10, a terminal amino group concentration of 48 µeq/g, and a terminal carboxyl group concentration of 24 µeq/g. (Hereinafter, the Polyamide 12 is referred to as (A1-1).). The ratio of the number of methylene groups to the number of the amide groups $[CH_2]/[NHCO]$ of Polyamide 12 (A1-1) is 11.0, which satisfies 7.0 or more. Further, for the terminal amino group concentration [A] (µeq/g) and the terminal carboxyl group concentration [B] (µeq/g) of Polyamide 12 (A1-1), the relationship [A]>[B]+5 is satisfied.

[Production of Polyamide 612 (A1-2)]

Into a pressure-resistant reaction vessel having an internal volume of 70 liters and equipped with a stirrer, 16.42 kg (50.0 mol) of an equivalent molar salt of 1, 6-hexanediamine and dodecanedioic acid, 16.3 g (0.14 mol) of 1, 6-hexanediamine, and 5.0 L of a distilled water were charged. After replacing the inside of a polymerization tank with nitrogen, the mixture was heated to 220° C. and stirred so that the inside of the reaction system became a uniform state at this temperature. Then, the temperature in the polymerization tank was raised to 270° C., and polymerization was carried out for 2 hours under stirring while adjusting the pressure in the tank to 1.7 MPa. Thereafter, the pressure was released to normal pressure over about 2 hours, then, the pressure was reduced to 53 kPa and polymerization was carried out under reduce pressure for 4 hours. Then, nitrogen was introduced into the autoclave, and after the pressure was reduced to normal pressure, the product was drawn out from the nozzle at the lower portion of the reaction vessel and cut to obtain pellets. The pellets were dried under reduced pressure to obtain Polyamide 612 having a relative viscosity of 2.48, a terminal amino group concentration of 50 µeq/g, a terminal carboxyl group concentration of 35 µeq/g. (Hereinafter, the Polyamide 612 is referred as (A1-2).) The ratio of the number of methylene groups to the number of the amide groups $[CH_2]/[NHCO]$ of Polyamide 612 (A1-2) is 8.0, which satisfies 7.0 or more. Further, for the terminal amino group concentration [A] (µeq/g) and the terminal carboxyl group concentration [B] (µeq/g) of Polyamide 612 (A1-2), the relationship [A]>[B]+5 is satisfied.

(2) Elastomer Polymer (A2)

Maleic anhydride-modified ethylene/1-butene copolymer (A2-1) (manufactured by Mitsui Chemicals, Inc., TAFMER MH5010, the acid anhydride group concentration: 50 µeq/g)

Maleic anhydride-modified ethylene/1-butene copolymer (A2-2) (manufactured by Mitsui Chemicals, Inc., TAFMER MH5020, the acid anhydride group concentration: 100 µeq/g)

(3) Plasticizer (A3)

2-Hexyldecyl p-hydroxybenzoate ester (A3-1) (manufactured by Kao Corporation, EXCEPARL HDPB)

Hexadecyl p-hydroxybenzoate ester (A3-2) (manufactured by UENO FINE CHEMICALS INDUSTRY, LTD., CEPB)

N-Butylbenzenesulfonamide (A3-3) (manufactured by Proviron, Proviplast 024)

2-Ethylhexyl p-hydroxybenzoate ester (A3-4) (manufactured by UENO FINE CHEMICALS INDUSTRY, LTD., EHPB)

(4) Aliphatic Polyamide Composition (A)

[Production of Aliphatic Polyamide Composition (A-1)]

To Polyamide 12 (A1-1) were previously added a maleic anhydride-modified ethylene/1-butene copolymer (A2-1) as the elastomer polymer, 2-hexyldecyl p-hydroxybenzoate ester (A3-1) as the plasticizer, triethylene glycol-bis[3-(3-t-butyl-5-methyl-4-hydroxyphenyl)propionate] (manufactured by BASF Japan Ltd., IRGANOX 245) as the antioxidant, and tris(2, 4-di-t-butylphenyl)phosphite (manufactured by BASF Japan Ltd., IRGAFOS168) as a phosphorous-based processing stabilizer. The resulting mixture was supplied to a twin-screw melt kneader (manufactured by Japan Steel Works, Ltd., Model TEX44), and melted and kneaded in a cylinder temperature of 180° C. to 270° C. After extruding the melted resin in a shape of strand, the resin was introduced into a water tank. The resin was cooled, cut, and dried under vacuum to obtain pellets of the aliphatic polyamide composition (A-1) containing 0.8 parts by mass of the anti-oxidant and 0.2 parts by mass of the phosphorous-based processing stabilizer based on 100 parts by mass of Polyamide 12 (A1-1)/elastomer polymer (A2-1)/plasticizer (A3-1)=85.0/10.0/5.0 (mass %) in total. The bending elastic modulus of the aliphatic polyamide composition (A-1) was 600 MPa.

[Production of Aliphatic Polyamide Composition (A-2)]

Pellets of the aliphatic polyamide composition (A-2) containing 0.8 parts by mass of the anti-oxidant and 0.2 parts by mass of the phosphorous-based processing stabilizer based on 100 parts by mass of Polyamide 12 (A1-1)/elastomer polymer (A2-1)/plasticizer (A3-1)=87.5/10.0/2.5 (mass %) in total were obtained by the similar method as the production of the aliphatic polyamide composition (A-1) except that the added amounts of the elastomer polymer and the plasticizer were changed in the production of the aliphatic polyamide composition (A-1). The bending elastic modulus of the aliphatic polyamide composition (A-2) as measured in compliance with ISO 178 was 850 MPa.

[Production of Aliphatic Polyamide Composition (A-3)]

Pellets of the aliphatic polyamide composition (A-3) containing 0.8 parts by mass of the anti-oxidant and 0.2 parts by mass of the phosphorous-based processing stabilizer based on 100 parts by mass of Polyamide 12 (A1-1)/elastomer polymer (A2-1)/plasticizer (A3-1)=85.0/5.0/10.0 (mass %) in total were obtained by the similar method as the production of the aliphatic polyamide composition (A-1) except that the added amounts of the elastomer polymer and the plasticizer were changed in the production of the aliphatic polyamide composition (A-1). The bending elastic modulus of the aliphatic polyamide composition (A-3) as measured in compliance with ISO 178 was 490 MPa.

[Production of Aliphatic Polyamide Composition (A-4)]

Pellets of the aliphatic polyamide composition (A-4) containing 0.8 parts by mass of the anti-oxidant and 0.2 parts by mass of the phosphorous-based processing stabilizer based on 100 parts by mass of Polyamide 12 (A1-1)/elastomer polymer (A2-1)/plasticizer (A3-2)=85.0/10.0/5.0 (mass %) in total were obtained by the similar method as the production of the aliphatic polyamide composition (A-1) except that 2-hexyldecyl p-hydroxybenzoate ester (A3-1) was changed to hexadecyl p-hydroxybenzoate ester (A3-2) in the production of the aliphatic polyamide composition (A-1). The bending elastic modulus of the aliphatic polyamide composition (A-4) as measured in compliance with ISO 178 was 620 MPa.

[Production of Aliphatic Polyamide Composition (A-5)]

Pellets of the aliphatic polyamide composition (A-5) containing 0.8 parts by mass of the anti-oxidant and 0.2 parts by mass of the phosphorous-based processing stabilizer based on 100 parts by mass of Polyamide 12 (A1-1)/elastomer polymer (A2-2)/plasticizer (A3-1)=85.0/10.0/5.0 (mass %) in total were obtained by the similar method as the production of the aliphatic polyamide composition (A-1) except that maleic anhydride-modified ethylene/1-butene copolymer (A2-1) was changed to (A2-2) in the production of the aliphatic polyamide composition (A-1). The bending elastic modulus of the aliphatic polyamide composition (A-5) as measured in compliance with ISO 178 was 620 MPa.

[Production of Aliphatic Polyamide Composition (A-6)]

Pellets of the aliphatic polyamide composition (A-6) containing 0.8 parts by mass of the anti-oxidant and 0.2 parts by mass of the phosphorous-based processing stabilizer based on 100 parts by mass of Polyamide 612(A1-2)/elastomer polymer (A2-1)/plasticizer (A3-1)=85.0/10.0/5.0 (mass %) in total were obtained by the similar method as the production of the aliphatic polyamide composition (A-1) except that Polyamide 12 (A1-1) was changed to Polyamide 612 (A1-2) in the production of the aliphatic polyamide composition (A-1). The bending elastic modulus of the aliphatic polyamide composition (A-6) as measured in compliance with ISO 178 was 890 MPa.

[Production of Aliphatic Polyamide Composition (A-7)]

Pellets of the aliphatic polyamide composition (A-7) containing 0.8 parts by mass of the anti-oxidant and 0.2 parts by mass of the phosphorous-based processing stabilizer based on 100 parts by mass of Polyamide 12 (A1-1)/elastomer polymer (A2-1)=70.0/30.0 (mass %) in total were obtained by the similar method as the production of the aliphatic polyamide composition (A-1) except that 2-hexyldecyl p-hydroxybenzoate ester (A3-1) was not added, and the added amount of the maleic anhydride-modified ethylene/1-butene copolymer (A2-1) was changed in the production of the aliphatic polyamide composition (A-1). The bending elastic modulus of the aliphatic polyamide composition (A-7) as measured in compliance with ISO 178 was 800 MPa.

[Production of Aliphatic Polyamide Composition (A-8)]

Pellets of the aliphatic polyamide composition (A-8) containing 0.8 parts by mass of the anti-oxidant and 0.2 parts by mass of the phosphorous-based processing stabilizer based on 100 parts by mass of Polyamide 12 (A1-1)/elastomer polymer (A2-1)=80.0/20.0 (mass %) in total were obtained by the similar method as the production of the aliphatic polyamide composition (A-7) except that the added amount of the maleic anhydride-modified ethylene/1-butene copolymer (A2-1) was changed in the production of the aliphatic polyamide composition (A-7). The bending elastic modulus of the aliphatic polyamide composition (A-8) as measured in compliance with ISO 178 was 1,100 MPa.

[Production of Aliphatic Polyamide Composition (A-9)]

Pellets of the aliphatic polyamide composition (A-9) containing 0.8 parts by mass of the anti-oxidant and 0.2 parts by mass of the phosphorous-based processing stabilizer based on 100 parts by mass of Polyamide 12 (A1-1)/elastomer polymer (A2-1)=60.0/40.0 (mass %) in total were obtained by the similar method as the production of the aliphatic polyamide composition (A-7) except that the added amount of the maleic anhydride-modified ethylene/1-butene copolymer (A2-1) was changed in the production of the aliphatic polyamide composition (A-7). The bending elastic modulus of the aliphatic polyamide composition (A-9) as measured in compliance with ISO 178 was 650 MPa.

[Production of Aliphatic Polyamide Composition (A-10)]

Pellets of the aliphatic polyamide composition (A-10) containing 0.8 parts by mass of the anti-oxidant and 0.2 parts by mass of the phosphorous-based processing stabilizer based on 100 parts by mass of Polyamide 612 (A1-2)/elastomer polymer (A2-1)=70.0/30.0 (mass %) in total were obtained by the similar method as the production of the aliphatic polyamide composition (A-7) except that Polyamide 12 (A1-1) was changed to Polyamide 612 (A1-2) in the production of the aliphatic polyamide composition (A-7). The bending elastic modulus of the aliphatic polyamide composition (A-10) as measured in compliance with ISO 178 was 1,150 MPa.

[Production of Aliphatic Polyamide Composition (A-11)]

Pellets of the aliphatic polyamide composition (A-11) containing 0.8 parts by mass of the anti-oxidant and 0.2 parts by mass of the phosphorous-based processing stabilizer based on 100 parts by mass of Polyamide 12 (A1-1)/elastomer polymer (A2-1)/plasticizer (A3-1)=75.0/5.0/20.0 (mass %) in total were obtained by the similar method as the production of the aliphatic polyamide composition (A-1) except that the added amounts of the maleic anhydride-modified ethylene/1-butene copolymer (A2-1) and 2-hexyldecyl p-hydroxybenzoate ester (A3-1) were changed in the production of the aliphatic polyamide composition (A-1). The bending elastic modulus of the aliphatic polyamide composition (A-11) as measured in compliance with ISO 178 was 260 MPa.

[Production of Aliphatic Polyamide Composition (A-12)]

Pellets of the aliphatic polyamide composition (A-12) containing 0.8 parts by mass of the anti-oxidant and 0.2 parts by mass of the phosphorous-based processing stabilizer based on 100 parts by mass of Polyamide 12 (A1-1)/elastomer polymer (A2-1)/plasticizer (A3-3)=85.0/10.0/5.0 (mass %) in total were obtained by the similar method as the production of the aliphatic polyamide composition (A-1) except that 2-hexyldecyl p-hydroxybenzoate ester (A3-1) was changed to N-butylbenzenesulfonamide (A3-3) in the production of the aliphatic polyamide composition (A-1). The bending elastic modulus of the aliphatic polyamide composition (A-12) as measured in compliance with ISO 178 was 500 MPa.

[Production of Aliphatic Polyamide Composition (A-13)]

Pellets of the aliphatic polyamide composition (A-13) containing 0.8 parts by mass of the anti-oxidant and 0.2 parts by mass of the phosphorous-based processing stabilizer based on 100 parts by mass of Polyamide 12 (A1-1)/elastomer polymer (A2-1)/plasticizer (A3-4)=85.0/10.0/5.0

(mass %) in total were obtained by the similar method as the production of the aliphatic polyamide composition (A-1) except that 2-hexyldecyl p-hydroxybenzoate ester (A3-1) was changed to 2-ethylhexyl p-hydroxybenzoate ester (A3-4) in the production of the aliphatic polyamide composition (A-1). The bending elastic modulus of the aliphatic polyamide composition (A-13) as measured in compliance with ISO 178 was 610 MPa.

(5) Modified Polyolefin (B)

Modified polypropylene (B-1) (manufactured by Mitsui Chemicals, Inc., Admer QB520E, the melting point: 160° C., MFR (230° C./2,160 g): 1.8 g/10 min, the density: 0.90 g/cm$^3$)

(6) Polyolefin (C)

Polypropylene (C-1) (manufactured by Prime Polymer Co., Ltd., PrimePolypro E-702MG, the melting point: 162° C., the tensile yield stress: 30 MPa, Charpy impact strength (notched, 23° C.): 58 kJ/m$^2$)

Polybutene-1 (C-2) (manufactured by Mitsui Chemicals, Inc., BEAULON P5050, the melting point: 128° C., the tensile yield stress: 27 MPa, Charpy impact strength (notched, 23° C.): 49 kJ/m$^2$)

5. Production of Multilayer Tube

Example 1

Using the above-described aliphatic polyamide composition (A-1) and the modified polypropylene(B-1), (A-1) and (B-1) were separately melted and extruded at an extrusion temperature of 270° C. and 220° C. in Plabor (manufactured by PLABOR Research Laboratory of Plastics Technology Co., Ltd) two layer tube processing machine, respectively. The extruded melted resins were mixed by an adaptor, and processed to form a multilayer tubular body. Then the body was cooled by a dimension regulating sizing die and withdrawn to obtain a multilayer tube having a layer configuration of (a)/(b)=0.75/0.25 mm, the inner diameter of 6.0 mm and the outer diameter of 8.0 mm when the layer (a) (outermost layer) is composed of (A-1), and the layer (b) (innermost layer) is composed of (B-1). The measuring result of the properties for this multilayer tube is shown in Table 1.

Example 2

A multilayer tube having a layer configuration of (a)/(b)=0.65/0.35 mm, the inner diameter of 6.0 mm and the outer diameter of 8.0 mm was obtained by the similar method as Example 1 except that the thicknesses of the layers were changed in Example 1. The measuring result of the properties for this multilayer tube is shown in Table 1.

Example 3

A multilayer tube having a layer configuration of (a)/(b)=0.80/0.20 mm, the inner diameter of 6.0 mm and the outer diameter of 8.0 mm was obtained by the similar method as Example 1 except that the thicknesses of the layers were changed in Example 1. The measuring result of the properties for this multilayer tube is shown in Table 1.

Example 4

A multilayer tube having the layer configuration shown in Table 1 was obtained by the similar method as Example 1 except that the aliphatic polyamide composition (A-1) was changed to (A-2) in Example 1. The measuring result of the properties for this multilayer tube is shown in Table 1.

Example 5

A multilayer tube having the layer configuration shown in Table 1 was obtained by the similar method as Example 2 except that the aliphatic polyamide composition (A-1) was changed to (A-2) in Example 2. The measuring result of the properties for this multilayer tube is shown in Table 1.

Example 6

A multilayer tube having the layer configuration shown in Table 1 was obtained by the similar method as Example 3 except that the aliphatic polyamide composition (A-1) was changed to (A-2) in Example 3. The measuring result of the properties for this multilayer tube is shown in Table 1.

Example 7

A multilayer tube having the layer configuration shown in Table 1 was obtained by the similar method as Example 1 except that the aliphatic polyamide composition (A-1) was changed to (A-3) in Example 1. The measuring result of the properties for this multilayer tube is shown in Table 1.

Example 8

A multilayer tube having the layer configuration shown in Table 1 was obtained by the similar method as Example 2 except that the aliphatic polyamide composition (A-1) was changed to (A-3) in Example 2. The measuring result of the properties for this multilayer tube is shown in Table 1.

Example 9

A multilayer tube having the layer configuration shown in Table 1 was obtained by the similar method as Example 3 except that the aliphatic polyamide composition (A-1) was changed to (A-3) in Example 3. The measuring result of the properties for this multilayer tube is shown in Table 1.

Example 10

A multilayer tube having the layer configuration shown in Table 1 was obtained by the similar method as Example 1 except that the aliphatic polyamide composition (A-1) was changed to (A-4) in Example 1. The measuring result of the properties for this multilayer tube is shown in Table 1.

Example 11

A multilayer tube having the layer configuration shown in Table 1 was obtained by the similar method as Example 2 except that the aliphatic polyamide composition (A-1) was changed to (A-4) in Example 2. The measuring result of the properties for this multilayer tube is shown in Table 1.

Example 12

A multilayer tube having the layer configuration shown in Table 1 was obtained by the similar method as Example 3 except that the aliphatic polyamide composition (A-1) was changed to (A-4) in Example 3. The measuring result of the properties for this multilayer tube is shown in Table 1.

Example 13

A multilayer tube having the layer configuration shown in Table 1 was obtained by the similar method as Example 1 except that the aliphatic polyamide composition (A-1) was changed to (A-5) in Example 1. The measuring result of the properties for this multilayer tube is shown in Table 1.

Example 14

A multilayer tube having the layer configuration shown in Table 1 was obtained by the similar method as Example 2 except that the aliphatic polyamide composition (A-1) was changed to (A-5) in Example 2. The measuring result of the properties for this multilayer tube is shown in Table 1.

Example 15

A multilayer tube having the layer configuration shown in Table 1 was obtained by the similar method as Example 3 except that the aliphatic polyamide composition (A-1) was changed to (A-5) in Example 3. The measuring result of the properties for this multilayer tube is shown in Table 1.

Example 16

A multilayer tube having the layer configuration shown in Table 1 was obtained by the similar method as Example 1 except that the aliphatic polyamide composition (A-1) was changed to (A-6) in Example 1. The measuring result of the properties for this multilayer tube is shown in Table 1.

Example 17

A multilayer tube having the layer configuration shown in Table 1 was obtained by the similar method as Example 2 except that the aliphatic polyamide composition (A-1) was changed to (A-6) in Example 2. The measuring result of the properties for this multilayer tube is shown in Table 1.

Example 18

A multilayer tube having the layer configuration shown in Table 1 was obtained by the similar method as Example 3 except that the aliphatic polyamide composition (A-1) was changed to (A-6) in Example 3. The measuring result of the properties for this multilayer tube is shown in Table 1.

Example 19

A multilayer tube having the layer configuration shown in Table 1 was obtained by the similar method as Example 1 except that the aliphatic polyamide composition (A-1) was changed to (A-7) in Example 1. The measuring result of the properties for this multilayer tube is shown in Table 1.

Example 20

A multilayer tube having the layer configuration shown in Table 1 was obtained by the similar method as Example 2 except that the aliphatic polyamide composition (A-1) was changed to (A-7) in Example 2. The measuring result of the properties for this multilayer tube is shown in Table 1.

Example 21

A multilayer tube having the layer configuration shown in Table 1 was obtained by the similar method as Example 3 except that the aliphatic polyamide composition (A-1) was changed to (A-7) in Example 3. The measuring result of the properties for this multilayer tube is shown in Table 1.

Example 22

Using the above-described aliphatic polyamide composition (A-1), the modified polypropylene (B-1), and polypropylene (C-1), (A-1), (B-1) and (C-1) were separately melted and extruded at an extrusion temperature of 270° C., 220° C. and 220° C. in Plabor (manufactured by PLABOR Research Laboratory of Plastics Technology Co., Ltd) three layer tube processing machine, respectively. The extruded melted resins were mixed by an adaptor, and processed to form a multilayer tubular body. Then the body was cooled by a dimension regulating sizing die and withdrawn to obtain a multilayer tube having a layer configuration of (a)/(b)/(c)= 0.75/0.10/0.15 mm, the inner diameter of 6.0 mm and the outer diameter of 8.0 mm when the layer (a) (outermost layer) is composed of (A-1), the layer (b) (intermediate layer) is composed of (B-1), and the layer (c) (innermost layer) is composed of (C-1). The measuring result of the properties for this multilayer tube is shown in Table 2.

Example 23

A multilayer tube having a layer configuration of (a)/(b)/(c)=0.65/0.10/0.25 mm, the inner diameter of 6.0 mm and the outer diameter of 8.0 mm was obtained by the similar method as Example 22 except that the thicknesses of the layers were changed in Example 22. The measuring result of the properties for this multilayer tube is shown in Table 2.

Example 24

A multilayer tube having a layer configuration of (a)/(b)/(c)=0.80/0.10/0.10 mm, the inner diameter of 6.0 mm and the outer diameter of 8.0 mm was obtained by the similar method as Example 22 except that the thicknesses of the layers were changed in Example 22. The measuring result of the properties for this multilayer tube is shown in Table 2.

Example 25

A multilayer tube having the layer configuration shown in Table 1 was obtained by the similar method as Example 22 except that the aliphatic polyamide composition (A-1) was changed to (A-2) in Example 22. The measuring result of the properties for this multilayer tube is shown in Table 2.

Example 26

A multilayer tube having the layer configuration shown in Table 1 was obtained by the similar method as Example 23 except that the aliphatic polyamide composition (A-1) was changed to (A-2) in Example 23. The measuring result of the properties for this multilayer tube is shown in Table 2.

Example 27

A multilayer tube having the layer configuration shown in Table 1 was obtained by the similar method as Example 22 except that the aliphatic polyamide composition (A-1) was changed to (A-3) in Example 22. The measuring result of the properties for this multilayer tube is shown in Table 2.

Example 28

A multilayer tube having the layer configuration shown in Table 1 was obtained by the similar method as Example 23 except that the aliphatic polyamide composition (A-1) was changed to (A-3) in Example 23. The measuring result of the properties for this multilayer tube is shown in Table 2.

Example 29

A multilayer tube having the layer configuration shown in Table 1 was obtained by the similar method as Example 22 except that the aliphatic polyamide composition (A-1) was changed to (A-4) in Example 22. The measuring result of the properties for this multilayer tube is shown in Table 2.

Example 30

A multilayer tube having the layer configuration shown in Table 1 was obtained by the similar method as Example 23 except that the aliphatic polyamide composition (A-1) was changed to (A-4) in Example 23. The measuring result of the properties for this multilayer tube is shown in Table 2.

Example 31

A multilayer tube having the layer configuration shown in Table 1 was obtained by the similar method as Example 22 except that the aliphatic polyamide composition (A-1) was changed to (A-5) in Example 22. The measuring result of the properties for this multilayer tube is shown in Table 2.

Example 32

A multilayer tube having the layer configuration shown in Table 1 was obtained by the similar method as Example 23 except that the aliphatic polyamide composition (A-1) was changed to (A-5) in Example 23. The measuring result of the properties for this multilayer tube is shown in Table 2.

Example 33

A multilayer tube having the layer configuration shown in Table 1 was obtained by the similar method as Example 22 except that the aliphatic polyamide composition (A-1) was changed to (A-6) in Example 22. The measuring result of the properties for this multilayer tube is shown in Table 2.

Example 34

A multilayer tube having the layer configuration shown in Table 1 was obtained by the similar method as Example 23 except that the aliphatic polyamide composition (A-1) was changed to (A-6) in Example 23. The measuring result of the properties for this multilayer tube is shown in Table 2.

Example 35

A multilayer tube having the layer configuration shown in Table 1 was obtained by the similar method as Example 22 except that the aliphatic polyamide composition (A-1) was changed to (A-7) in Example 22. The measuring result of the properties for this multilayer tube is shown in Table 2.

Example 36

A multilayer tube having the layer configuration shown in Table 1 was obtained by the similar method as Example 23 except that the aliphatic polyamide composition (A-1) was changed to (A-7) in Example 23. The measuring result of the properties for this multilayer tube is shown in Table 2.

Example 37

A multilayer tube having the layer configuration shown in Table 1 was obtained by the similar method as Example 22 except that polypropylene (C-1) was changed to polybutene-1 (C-2) in Example 22. The measuring result of the properties for this multilayer tube is shown in Table 2.

Comparative Example 1

A multilayer tube having the layer configuration shown in Table 1 was obtained by the similar method as Example 1 except that the aliphatic polyamide composition (A-1) was changed to (A-8) in Example 1. The measuring result of the properties for this multilayer tube is shown in Table 1.

Comparative Example 2

A multilayer tube having the layer configuration shown in Table 1 was obtained by the similar method as Example 1 except that the aliphatic polyamide composition (A-1) was changed to (A-9) in Example 1. The measuring result of the properties for this multilayer tube is shown in Table 1.

Comparative Example 3

A multilayer tube having the layer configuration shown in Table 1 was obtained by the similar method as Example 1 except that the aliphatic polyamide composition (A-1) was changed to (A-10) in Example 1. The measuring result of the properties for this multilayer tube is shown in Table 1.

Comparative Example 4

A multilayer tube having the layer configuration shown in Table 1 was obtained by the similar method as Example 1 except that the aliphatic polyamide composition (A-1) was changed to (A-11) in Example 1. The measuring result of the properties for this multilayer tube is shown in Table 1.

Comparative Example 5

A multilayer tube having the layer configuration shown in Table 1 was obtained by the similar method as Example 1 except that the aliphatic polyamide composition (A-1) was changed to (A-12) in Example 1. The measuring result of the properties for this multilayer tube is shown in Table 1.

Comparative Example 6

A multilayer tube having the layer configuration shown in Table 1 was obtained by the similar method as Example 1 except that the aliphatic polyamide composition (A-1) was changed to (A-13) in Example 1. The measuring result of the properties for this multilayer tube is shown in Table 1.

Comparative Example 7

A multilayer tube having a layer configuration of (a)/(b) =0.50/0.50 mm, the inner diameter of 6.0 mm and the outer diameter of 8.0 mm was obtained by the similar method as Example 1 except that the thicknesses of the layers were changed in Example 1. The measuring result of the properties for this multilayer tube is shown in Table 1.

Comparative Example 8

A multilayer tube having the layer configuration shown in Table 1 was obtained by the similar method as Example 22 except that the aliphatic polyamide composition (A-1) was changed to (A-8) in Example 22. The measuring result of the properties for this multilayer tube is shown in Table 2.

Comparative Example 9

A multilayer tube having the layer configuration shown in Table 1 was obtained by the similar method as Example 22 except that the aliphatic polyamide composition (A-1) was changed to (A-9) in Example 22. The measuring result of the properties for this multilayer tube is shown in Table 2.

Comparative Example 10

A multilayer tube having the layer configuration shown in Table 1 was obtained by the similar method as Example 22 except that the aliphatic polyamide composition (A-1) was changed to (A-10) in Example 22. The measuring result of the properties for this multilayer tube is shown in Table 2.

Comparative Example 11

A multilayer tube having the layer configuration shown in Table 1 was obtained by the similar method as Example 22 except that the aliphatic polyamide composition (A-1) was changed to (A-11) in Example 22. The measuring result of the properties for this multilayer tube is shown in Table 2.

Comparative Example 12

A multilayer tube having the layer configuration shown in Table 1 was obtained by the similar method as Example 22 except that the aliphatic polyamide composition (A-1) was changed to (A-12) in Example 22. The measuring result of the properties for this multilayer tube is shown in Table 2.

Comparative Example 13

A multilayer tube having the layer configuration shown in Table 1 was obtained by the similar method as Example 22 except that the aliphatic polyamide composition (A-1) was changed to (A-13) in Example 22. The measuring result of the properties for this multilayer tube is shown in Table 2.

Comparative Example 14

A multilayer tube having a layer configuration of (a)/(b)/(c)=0.50/0.10/0.40 mm, the inner diameter of 6.0 mm and the outer diameter of 8.0 mm was obtained by the similar method as Example 22 except that the thicknesses of the layers were changed in Example 22. The measuring result of the properties for this multilayer tube is shown in Table 2.

TABLE 1

| | Outermost layer | | Innermost layer | | Low temp. impact resistance (no. of test tubes ruptured/no. of test tubes) | Breakage pressure strength at High temp. (115° C.) [MPa] | Bending stiffness [N] | Weight loss [%] | Eluted amount of the plasticizer [g/m$^2$] | Whether sulfur atom was detected |
|---|---|---|---|---|---|---|---|---|---|---|
| | Type | Thickness [mm] | Type | Thickness [mm] | | | | | | |
| Ex. 1 | A-1 | 0.75 | B-1 | 0.25 | 0/5 | 2.4 | 20 | 0.7 | 0.5 | no |
| Ex. 2 | A-1 | 0.65 | B-1 | 0.35 | 0/5 | 2.0 | 18 | 0.6 | 0.4 | no |
| Ex. 3 | A-1 | 0.80 | B-1 | 0.20 | 0/5 | 2.7 | 23 | 0.7 | 0.8 | no |
| Ex. 4 | A-2 | 0.75 | B-1 | 0.25 | 0/5 | 2.8 | 22 | 0.5 | 0.3 | no |
| Ex. 5 | A-2 | 0.65 | B-1 | 0.35 | 0/5 | 2.1 | 19 | 0.5 | 0.2 | no |
| Ex. 6 | A-2 | 0.80 | B-1 | 0.20 | 0/5 | 3.0 | 25 | 0.6 | 0.8 | no |
| Ex. 7 | A-3 | 0.75 | B-1 | 0.25 | 0/5 | 2.3 | 19 | 1.0 | 1.0 | no |
| Ex. 8 | A-3 | 0.65 | B-1 | 0.35 | 0/5 | 1.8 | 15 | 0.8 | 0.5 | no |
| Ex. 9 | A-3 | 0.80 | B-1 | 0.20 | 0/5 | 2.7 | 20 | 0.7 | 1.2 | no |
| Ex. 10 | A-4 | 0.75 | B-1 | 0.25 | 0/5 | 2.6 | 19 | 0.5 | 0.3 | no |
| Ex. 11 | A-4 | 0.65 | B-1 | 0.35 | 0/5 | 2.2 | 18 | 0.3 | 0.2 | no |
| Ex. 12 | A-4 | 0.80 | B-1 | 0.20 | 0/5 | 2.9 | 22 | 0.6 | 0.4 | no |
| Ex. 13 | A-5 | 0.75 | B-1 | 0.25 | 0/5 | 2.6 | 21 | 0.6 | 0.4 | no |
| Ex. 14 | A-5 | 0.65 | B-1 | 0.35 | 0/5 | 2.1 | 18 | 0.5 | 0.3 | no |
| Ex. 15 | A-5 | 0.80 | B-1 | 0.20 | 0/5 | 2.9 | 25 | 0.7 | 0.8 | no |
| Ex. 16 | A-6 | 0.75 | B-1 | 0.25 | 0/5 | 3.5 | 25 | 0.8 | 0.3 | no |
| Ex. 17 | A-6 | 0.65 | B-1 | 0.35 | 0/5 | 3.0 | 23 | 0.5 | 0.2 | no |
| Ex. 18 | A-6 | 0.80 | B-1 | 0.20 | 0/5 | 3.8 | 27 | 0.6 | 0.7 | no |
| Ex. 19 | A-7 | 0.75 | B-1 | 0.25 | 0/5 | 2.4 | 22 | 0.3 | <0.1 | no |
| Ex. 20 | A-7 | 0.65 | B-1 | 0.35 | 0/5 | 2.2 | 25 | 0.2 | <0.1 | no |
| Ex. 21 | A-7 | 0.80 | B-1 | 0.20 | 0/5 | 2.5 | 20 | 0.4 | <0.1 | no |
| Comp. Ex. 1 | A-8 | 0.75 | B-1 | 0.25 | 0/5 | 3.3 | 34 | 0.3 | <0.1 | no |
| Comp. Ex. 2 | A-9 | 0.75 | B-1 | 0.25 | 0/5 | 0.9 | 21 | 0.2 | <0.1 | no |
| Comp. Ex. 3 | A-10 | 0.75 | B-1 | 0.25 | 0/5 | 4.0 | 38 | 0.3 | <0.1 | no |
| Comp. Ex. 4 | A-11 | 0.75 | B-1 | 0.25 | 0/5 | 1.0 | 13 | 1.0 | 2.4 | no |
| Comp. Ex. 5 | A-12 | 0.75 | B-1 | 0.25 | 0/5 | 1.8 | 19 | 4.3 | 3.1 | no |

TABLE 1-continued

| | Outermost layer Type | Outermost layer Thickness [mm] | Innermost layer Type | Innermost layer Thickness [mm] | Low temp. impact resistance (no. of test tubes ruptured/ no. of test tubes) | Breakage pressure strength at High temp. (115° C.) [MPa] | Bending stiffness [N] | Weight loss [%] | Eluted amount of the plasticizer [g/m²] | Whether sulfur atom was detected |
|---|---|---|---|---|---|---|---|---|---|---|
| Comp. Ex. 6 | A-13 | 0.75 | B-1 | 0.25 | 0/5 | 2.2 | 22 | 3.3 | 2.5 | yes |
| Comp. Ex. 7 | A-1 | 0.50 | B-1 | 0.50 | 2/5 | 1.1 | 16 | 0.3 | <0.1 | no |

TABLE 2

| | Outermost layer Type | Outermost layer Thickness [mm] | intermediate layer Type | intermediate layer Thickness [mm] | Innermost layer Type | Innermost layer Thickness [mm] | Low temp. impact resistance (no. of test tubes ruptured/ no. of test tubes) | Breakage pressure strength at High temp. (115° C.) [MPa] | Bending stiffness [N] | Weight loss [%] | Eluted amount of the plasticizer [g/m²] | Whether sulfur atom was detected |
|---|---|---|---|---|---|---|---|---|---|---|---|---|
| Ex. 22 | A-1 | 0.75 | B-1 | 0.10 | C-1 | 0.15 | 0/5 | 2.6 | 22 | 0.9 | 1.2 | no |
| Ex. 23 | A-1 | 0.65 | B-1 | 0.10 | C-1 | 0.25 | 0/5 | 2.1 | 19 | 0.7 | 0.7 | no |
| Ex. 24 | A-1 | 0.80 | B-1 | 0.10 | C-1 | 0.10 | 0/5 | 1.9 | 25 | 1.0 | 1.5 | no |
| Ex. 25 | A-2 | 0.75 | B-1 | 0.10 | C-1 | 0.15 | 0/5 | 2.9 | 25 | 0.6 | 0.3 | no |
| Ex. 26 | A-2 | 0.65 | B-1 | 0.10 | C-1 | 0.25 | 0/5 | 2.2 | 21 | 0.3 | 0.2 | no |
| Ex. 27 | A-3 | 0.75 | B-1 | 0.10 | C-1 | 0.15 | 0/5 | 2.3 | 20 | 1.3 | 1.6 | no |
| Ex. 28 | A-3 | 0.65 | B-1 | 0.10 | C-1 | 0.25 | 0/5 | 1.7 | 18 | 1.1 | 1.1 | no |
| Ex. 29 | A-4 | 0.75 | B-1 | 0.10 | C-1 | 0.15 | 0/5 | 2.8 | 22 | 0.4 | 0.3 | no |
| Ex. 30 | A-4 | 0.65 | B-1 | 0.10 | C-1 | 0.25 | 0/5 | 2.2 | 19 | 0.4 | 0.2 | no |
| Ex. 31 | A-5 | 0.75 | B-1 | 0.10 | C-1 | 0.15 | 0/5 | 2.8 | 23 | 0.8 | 1.0 | no |
| Ex. 32 | A-5 | 0.65 | B-1 | 0.10 | C-1 | 0.25 | 0/5 | 2.2 | 19 | 0.6 | 0.6 | no |
| Ex. 33 | A-6 | 0.75 | B-1 | 0.10 | C-1 | 0.15 | 0/5 | 3.4 | 28 | 0.5 | 1.0 | no |
| Ex. 34 | A-6 | 0.65 | B-1 | 0.10 | C-1 | 0.25 | 0/5 | 3.2 | 24 | 0.4 | 0.4 | no |
| Ex. 35 | A-7 | 0.75 | B-1 | 0.10 | C-1 | 0.15 | 0/5 | 2.1 | 22 | 0.3 | <0.1 | no |
| Ex. 36 | A-7 | 0.65 | B-1 | 0.10 | C-1 | 0.25 | 0/5 | 1.8 | 26 | 0.2 | <0.1 | no |
| Ex. 37 | A-1 | 0.75 | B-1 | 0.10 | C-2 | 0.15 | 0/5 | 2.7 | 23 | 0.8 | 1.0 | no |
| Comp. Ex. 8 | A-8 | 0.75 | B-1 | 0.10 | C-1 | 0.15 | 0/5 | 2.9 | 35 | 0.3 | <0.1 | no |
| Comp. Ex. 9 | A-9 | 0.75 | B-1 | 0.10 | C-1 | 0.15 | 0/5 | 0.8 | 23 | 0.2 | <0.1 | no |
| Comp. Ex. 10 | A-10 | 0.75 | B-1 | 0.10 | C-1 | 0.15 | 0/5 | 3.9 | 37 | 0.3 | <0.1 | no |
| Comp. Ex. 11 | A-11 | 0.75 | B-1 | 0.10 | C-1 | 0.15 | 0/5 | 1.1 | 16 | 0.8 | 2.6 | no |
| Comp. Ex. 12 | A-12 | 0.75 | B-1 | 0.10 | C-1 | 0.15 | 0/5 | 2.0 | 26 | 4.1 | 3.3 | no |
| Comp. Ex. 13 | A-13 | 0.75 | B-1 | 0.10 | C-1 | 0.15 | 0/5 | 1.9 | 26 | 3.5 | 2.8 | yes |
| Comp. Ex. 14 | A-1 | 0.50 | B-1 | 0.10 | C-1 | 0.40 | 0/5 | 1.0 | 18 | 0.3 | <0.1 | no |

As described before, it was found that the multilayer tubes of each Examples had excellent low temperature impact resistance, breakage pressure strength at high temperature, flexibility, dimensional stability, and elution resistance of low molecular weight substances and ion components.

What is claimed is:

1. A multilayer tube, which comprises two or more layers containing a layer (a) and a layer (b), wherein:
   the layer (a) contains an aliphatic polyamide composition (A);
   the layer (b) contains a modified polyolefin (B);
   the aliphatic polyamide composition (A) contains a polyamide (A1) and an elastomer polymer (A2);
   the polyamide (A1) is an aliphatic polyamide having a ratio of a number of methylene groups to a number of amide groups of 7.0 or more, and is contained in the aliphatic polyamide composition (A) in an amount of 70 mass % or more and 90 mass % or less;
   the elastomer polymer (A2) has a constituent unit derived from an unsaturated compound having a carboxyl group and/or an acid anhydride group, and is contained in the aliphatic polyamide composition (A) in an amount of 5 mass % or more and 30 mass % or less;
   the aliphatic polyamide composition (A) may contain a plasticizer (A3);
   the plasticizer (A3) has no sulfur atom, and has an ester structure of p- and/or o-hydroxybenzoic acid and a linear and/or branched alkylaliphatic alcohol having alcohol having a carbon atom number of 12 to 24, and the content of the plasticizer (A3) in the aliphatic polyamide composition (A) is 0 mass % or more and 15 mass % or less;
   the aliphatic polyamide composition (A) has a bending elastic modulus of 400 MPa or more and 1,000 MPa or less as measured in compliance with ISO 178;
   the modified polyolefin (B) has a unit derived from a monomer based on an α-olefin having a carbon atom number of 2 to 10, and has a melting point of 130° C. or more as measured in compliance with ISO 11357-3;
   in the multilayer tube, the layer (a) and the layer (b) are arranged in the order from the outside to the inside of the multilayer tube; and
   the thickness of the layer (a) occupies 60% or more of the total thickness of the tube.

2. The multilayer tube according to claim 1, wherein the polyamide (A1) is at least one homopolymer selected from the group consisting of polyundecanamide (Polyamide 11), polydodecamide (Polyamide 12), polyhexamethylene decamide (Polyamide 610), polyhexamethylene dodecamide (Polyamide 612), polydecamethylene decamide (Polyamide 1010), polydecamethylene dodecamide (Polyamide 1012), and polydodecamethylene dodecamide (Polyamide 1212), and/or a copolymer comprising several kinds of raw material monomers.

3. The multilayer tube according to claim 1, wherein a relationship [A]>[B]+5 is satisfied when a terminal amino group concentration of the polyamide (A1) per one gram is expressed as [A] (μeq/g), and a terminal carboxyl group concentration of the polyamide (A1) per one gram is expressed as [B] (μeq/g).

4. The multilayer tube according to claim 1, wherein the modified polyolefin (B) has a unit derived from an unsaturated compound containing at least one functional group selected from the group consisting of a carboxyl group or derivative thereof, hydroxyl group, epoxy group, amino group, amide group, imide group, nitrile group, thiol group, and isocyanate group.

5. The multilayer tube according to claim 1, wherein the modified polyolefin (B) is produced by a method comprising:
   melting a pre-modified polyolefin;
   adding the unsaturated compound containing the functional group to the pre-modified polyolefin to form a mixture; and
   graft-copolymerizing the mixture.

6. The multilayer tube according to claim 1, wherein the modified polyolefin (B) has an MFR value of 1.0 g/10 min to 10.0 g/10 min as measured in compliance with ISO 1133 under conditions of 230° C. and 2,160 g.

7. The multilayer tube according to claim 1, wherein the modified polyolefin (B) has a density of 0.85 g/cm$^3$ or more as measured in compliance with ISO 1183-3.

8. The multilayer tube according to claim 1, wherein the modified polyolefin (B) is a maleic anhydride-modified polypropylene, and the polypropylene content is 50 mass % or more.

9. The multilayer tube according to claim 1, wherein said multilayer tube is produced by co-extrusion molding.

10. The multilayer tube according to claim 1, wherein said multilayer tube is a coolant (LLC) cooler tube, a urea solution transporting tube, a tube for battery cooling and heating, or a tube for an air conditioner.

11. The multilayer tube according to claim 1, further comprising a layer (c);
   wherein the layer (c) contains a polyolefin (C); and
   the polyolefin (C) has a unit derived from a monomer based on an α-olefin having a carbon atom number of 2 to 10, and has a melting point of 120° C. or more as measured in compliance with ISO 11357-3, a tensile yield stress of 20 MPa or more as measured in compliance with ISO 527, and Charpy impact strength (notched) at 23° C. of 40 kJ/m$^2$ or more as measured in compliance with ISO 179/1eA.

12. The multilayer tube according to claim 11, wherein the layer (c) is disposed on an inner side of the layer (b).

* * * * *